United States Patent [19]

Higashii et al.

[11] Patent Number: 5,374,376
[45] Date of Patent: Dec. 20, 1994

[54] OPTICALLY ACTIVE AROMATIC COMPOUNDS, PREPARATION PROCESS THEREFOR, LIQUID CRYSTAL MATERIALS AND A LIGHT SWITCHING ELEMENT

[75] Inventors: Takayuki Higashii, Kishiwada; Isao Kurimoto, Toyonaka; Shoji Toda, Takarazuka; Masayoshi Minai, Moriyama; Shigeaki Chika; Koichi Fujisawa, both of Tsukuba; Kiyoshi Imamura, Toyonaka, all of Japan

[73] Assignee: Sumitomo Chemical Company, Limited, Osaka, Japan

[21] Appl. No.: 123,987

[22] Filed: Sep. 21, 1993

Related U.S. Application Data

[63] Continuation of Ser. No. 422,090, Oct. 16, 1989, abandoned, which is a continuation-in-part of Ser. No. 400,016, Aug. 29, 1989, abandoned.

[30] Foreign Application Priority Data

| Aug. 31, 1988 | [JP] | Japan | 63-219504 |
| Sep. 12, 1988 | [JP] | Japan | 63-229492 |
| Sep. 20, 1988 | [JP] | Japan | 63-237121 |
| Sep. 21, 1988 | [JP] | Japan | 63-238557 |

[51] Int. Cl.$^5$ ............ C09K 19/12; C09K 19/20; C07C 69/76
[52] U.S. Cl. ............ 252/299.65; 252/299.67; 560/59; 560/64; 560/65; 560/73; 560/102; 560/103; 560/105; 560/107; 560/108; 560/109; 560/111; 560/112
[58] Field of Search ............ 252/299.01, 299.65, 252/299.67; 560/55, 59, 60, 61, 62, 64, 65, 73, 102, 103, 105, 107, 108, 109, 106, 111, 112

[56] References Cited

U.S. PATENT DOCUMENTS

| 4,911,863 | 3/1990 | Sage et al. | 252/299.67 |
| 5,002,693 | 3/1991 | Higashii et al. | 252/299.65 |
| 5,013,479 | 5/1991 | Minai et al. | 252/299.67 |
| 5,124,070 | 6/1992 | Higashii et al. | 252/299.65 |

FOREIGN PATENT DOCUMENTS

| 0255219 | 2/1988 | European Pat. Off. |
| 0255962 | 2/1988 | European Pat. Off. |
| 0284371 | 3/1988 | European Pat. Off. |
| 63-101483 | 5/1988 | Japan |
| 63-135346 | 6/1988 | Japan |
| 63-172788 | 7/1988 | Japan |
| 8705012 | 8/1987 | WIPO |

OTHER PUBLICATIONS

Patent Abstracts of Japan, 14th Oct. 1988, p. 166 C 536; & JP-A-63 135 346 (Canon Inc.) Jul. 06, 1988.

*Primary Examiner*—Philip Tucker
*Attorney, Agent, or Firm*—Stevens, Davis, Miller & Mosher

[57] ABSTRACT

Disclosed are herein optically active aromatic compounds represented by the formula (I):

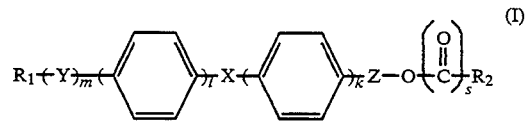

wherein X represents —COO— or —OCO—; Y represents —COO—, —OCO— or —O—; $R_2$ represents an alkyl or alkoxyalkyl group having 1 to 20 carbon atoms unsubstituted or substituted by a halogen atom; $R_1$ represents an alkyl group having 3 to 20 carbon atoms;

Z represents

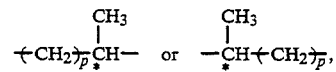

wherein p represents a number of 1 to 5 and * indicates an asymmetric carbon atom; l and k each represents a number of 1 or 2; m and s each represents a number of 0 or 1, which are useful as a liquid crystal.

8 Claims, No Drawings

OPTICALLY ACTIVE AROMATIC COMPOUNDS, PREPARATION PROCESS THEREFOR, LIQUID CRYSTAL MATERIALS AND A LIGHT SWITCHING ELEMENT

This application is a continuation of application Ser. No. 07/422,090, filed Oct. 16, 1989 now abandoned; which in turn is a continuation-in-part of application Ser. No. 07/400,016, filed Aug. 29, 1989 now abandoned.

The present invention relates to an optically active aromatic compound useful as a liquid crystal.

Image display devices utilizing liquid crystal are now widely provided for practical application, and particularly, TN (twisted nematic) type display system is popularly employed for such devices.

This system has many advantages such as small power consumption and softness to the eye because of the light-receiving type display panel which itself is not luminous, but on the other hand it has the defect that the response speed in image display is low.

Notwithstanding many efforts for improving the response characteristics of the liquid crystal compounds, any twisted nematic type display system comparable with the luminescent type display systems such as light-emitting diode, electroluminescence or plasma displays in response time has never been found.

Efforts have been continued for finding out a new display system which is high in the speed response while making full use of the advantages of liquid crystal displays which are light-receiving type and low in power consumption, and a display device utilizing an optical switching phenomenon of ferroelectric liquid crystal has been proposed in Applied Physical Letter, 36, 899 (1980).

This system utilizes a chiral smectic phase such as chiral smectic C phase which shows ferroelectricity, the chiral smectic C being hereinafter referred to as "Sc*" for brevity.

In addition, Published Unexamined Japanese Patent Application (Japanese Kokai) No. 61-195187 has proposed a liquid crystal composition exhibiting ferroelectricity as a whole, which comprises at least one compound or a composition exhibiting non-chiral smectic C, F, G, H or I phase, and at least one compound exhibiting ferroelectric liquid crystal phase. Moreover, in Mol. Cryst. Liq. Cryst., 89, 327 (1982) is disclosed a liquid crystal composition exhibiting ferroelectricity as a whole, which comprises at least one compound or a composition exhibiting non-chiral smectic C, F, G, H or I phase and an optically active compound or compounds exhibiting no ferroelectric liquid crystal phase.

In order to be put into practical use, the ferroelectric liquid crystal compound or composition is required to have sufficient spontaneous polarization, high speed responsiveness and low viscosity and exhibit a liquid crystal phase at a relatively low temperature. The aforementioned known compounds and compositions are not yet sufficient to meet such requirements.

The present inventors have undertaken extensive studies to find a compound useful as a liquid crystal meeting the requirements described above, and as a result found a specific optically active aromatic compound.

The present invention provides an optically active aromatic compound represented by the formula (I):

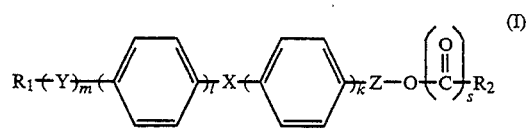

wherein X represents —COO— or —OCO—; Y represents —COO—, —OCO— or —O—; R$_2$ represents an alkyl or alkoxyalkyl group having 1 to 20 carbon atoms unsubstituted or substituted by a halogen atom; R$_1$ represents an alkyl group having 3 to 20 carbon atoms; Z represents

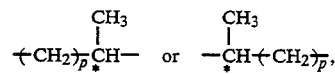

wherein P represents a number of 1 to 5 and * indicates an asymmetric carbon atom; l and k each represents a number of 1 or 2; m and s each represents a number of 0 or 1, and a process for producing the compound of the formula (I), which comprises reacting a phenol represented by the formula (II),

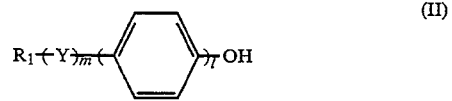

wherein R$_1$, Y, l and m are as defined above, with an optically active carboxylic acid represented by the formula (III),

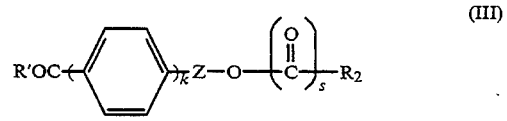

wherein R$_2$, s, k and Z are as defined above, R' represents a hydroxyl group or a halogen atom, or by reacting a carboxylic acid compound represented by the formula (IV),

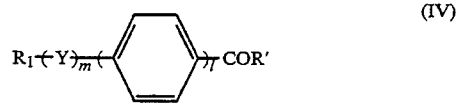

wherein R$_1$, Y, l and m have the meanings given above and R' represents a hydroxyl group or a halogen atom with an optically active phenol represented by the formula (V),

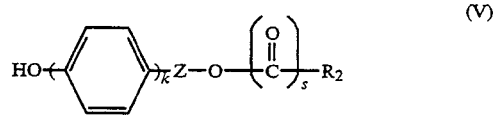

wherein R$_2$, k, s and Z have the meanings given above.

The present invention also provides a liquid crystal comprising at least one member selected from those represented by the formula (I), and a light switching element comprising the above liquid crystal.

The compound of the formula (I) in accordance with the present invention includes those exhibiting a liquid crystal phase including a ferroelectric phase such as Sc* phase, and those exhibiting no ferroelectric liquid crystal phase.

Whether the compound exhibits a liquid crystal phase or not can be determined by means of a polarizing microscope or the like.

The optically active carboxylic acids (III) usable for the production of compound (I) can be produced, for instance, in the following manner:

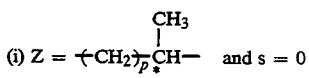

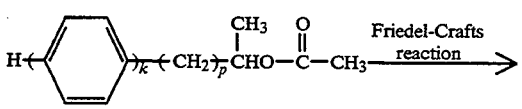

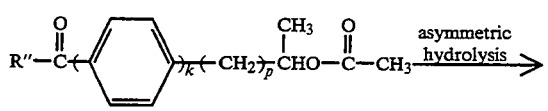

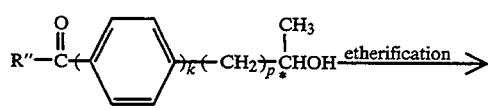

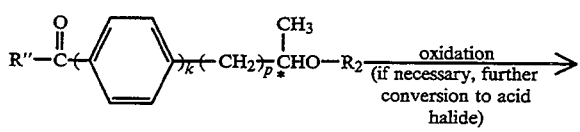

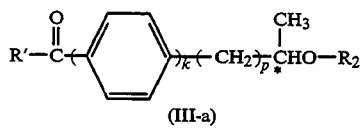

(III-a)

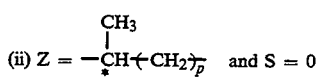

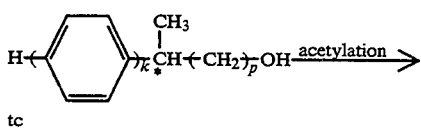

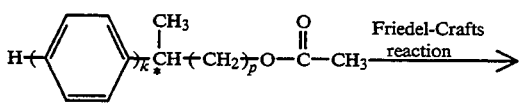

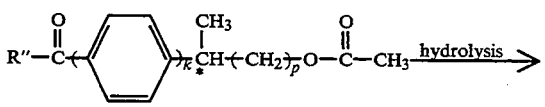

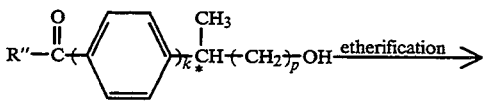

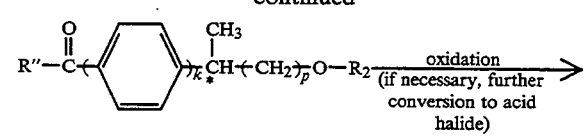

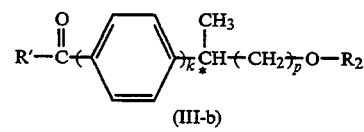

(III-b)

(In the above reaction formulas, R" represents methyl group, and R' represents hydroxyl group or a halogen atom)

(iii) s = 1

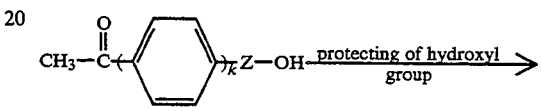

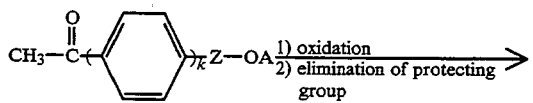

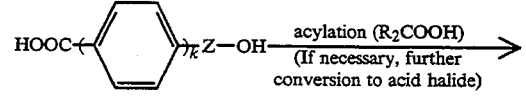

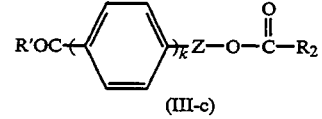

(III-c)

(In the above reaction formulas, A represents a protecting group such as tetrahydropyranyl, t-butyldimethylsilyl or benzyl group and R' is as defined above.)

Examples of said optically active carboxylic acids (III) are as follows:

(i) 4-(2-alkoxy-1-methyl)ethylbenzoic acid, 4-(2-alkylcarbonyloxy-1-methyl)ethylbenzoic acid, 4-(2-alkoxyalkyloxy-1-methyl)ethylbenzoic acid and 4-(2-alkoxyalkylcarbonyloxy-1-methyl)ethylbenzoic acid;

4-(3-alkoxy-1-methyl)propylbenzoic acid, 4-(4-alkoxy-1-methyl)butylbenzoic acid, 4-(5-alkoxy-1-methyl) pentylbenzoic acid, 4-(6-alkoxy-1-methyl)hexylbenzoic acid, and their analogues having alkylcarbonyloxy, alkoxyalkyloxy or alkoxyalkylcarbonyloxy in place of the alkoxy;

4-(2-alkoxy-1-methyl)ethyl-4'-biphenylcarboxylic acid, 4-(2-alkylcarbonyloxy-1-methyl)ethyl-4'-biphenylcarboxylic acid, 4-(2-alkoxyalkyloxy-1-methyl)ethyl-4'-biphenylcarboxylic acid and 4-(2-alkoxyalkylcarbonyloxy-1-methyl)ethyl-4'-biphenylcarboxylic acid;

4-(3-alkoxy-1-methyl) propyl-4'-biphenylcarboxylic acid, 4-(4-alkoxy-1-methyl)butyl-4'-biphenylcarboxylic acid, 4-(5-alkoxy-1-methyl)pentyl-4'-biphenylcarboxylic acid, 4-(6 -alkoxy-1-methyl)hexyl-4'-biphenylcarboxylic acid, and their analogues having alkylcarbonyloxy, alkoxyalkyloxy or alkoxyalkylcarbonyloxy in place of the alkoxy;

(ii) 4-(2-alkoxypropyl)benzoic acid, 4-(2-alkylcarbonyloxypropyl)benzoic acid, 4-(2-alkoxyalkyloxypropyl)benzoic acid and 4-(2-alkoxyalkylcarbonyloxypropyl)benzoic acid, 4-(2-alkoxypropyl)-4'-biphenylcarboxylic acid, 4-(2-alkylcarbonyloxypropyl)-4'-biphenylcarboxylic acid, 4-(2-alkoxyalkyloxypropyl)-4'-biphenylcarboxylic acid and 4-(2-alkoxyalkylcarbonyloxypropyl)-4'-biphenylcarboxylic aid;

(iii) 4-(3-alkoxybutyl)benzoic acid, 4-(3-alkylcarbonyloxybutyl)benzoic acid, 4-(3-alkoxyalkyloxybutyl)benzoic acid and 4-(3-alkoxyalkylcarbonyloxybutyl)benzoic acid, 4-(2-alkoxybutyl)-4'-biphenylcarboxylic acid, 4-(3-alkylcarbonyloxybutyl)-4'-biphenylcarboxylic acid, 4-(3-alkoxyalkyloxybutyl)-4'-biphenylcarboxylic acid and 4-(3-alkoxyalkylcarbonyloxybutyl)-4'-biphenylcarboxylic acid;

(iv) 4-(4-alkoxypentyl)benzoic acid, 4-(4-alkylcarbonyloxypentyl)benzoic acid, 4-(4-alkoxyalkyloxypentyl)benzoic acid and 4-(4-alkoxyalkylcarbonyloxypentyl)benzoic acid;

4-(4-alkoxypentyl)-4'-biphenylcarboxylic acid, 4-(4-alkylcarbonyloxypentyl)-4'-biphenylcarboxylic acid, 4-(4-alkoxyalkyloxypentyl)-4'-biphenylcarboxylic acid, 4-(4-alkoxyalkylcarbonyloxypentyl)-4'-biphenylcarboxylic acid and their analogues having 5-alkoxyhexyl, 5-alkylcarbonyloxyhexyl, 5-alkoxyalkyloxyhexyl, 5-alkoxyalkylcarbonyloxyhexyl, 6-alkoxyheptyl, 6-alkylcarbonyloxyheptyl, 6-alkoxyalkyloxyheptyl or 6-alkoxyalkylcarbonyloxyheptyl group in place of the 4-substituted pentyl.

These optically active carboxylic acids (III) can also be used as acid halides such as acid chloride and acid bromide.

In the above carboxylic acids, alkoxy, alkylcarbonyloxy, alkoxyalkyloxy and alkoxyalkylcarbonyloxy correspond to

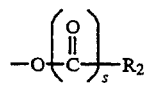

in the above formula (III). These alkyl group and alkoxyalkyl group are those of straight chain or branched chain and in case of branched chain, this may be an optically active group.

Examples of these alkyl group and alkoxyalkyl group are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, 1-methylethyl, 1-methylpropyl, 1-methylbutyl, 1-methylpentyl, 1-methylhexyl, 1-methylheptyl, 1-methyloctyl, 2-methylethyl, 2-methylbutyl, 2,3-dimethylbutyl, 2,3,3-trimethylbutyl, 2-methylpentyl, 3-methylpentyl , 2,3-dimethylpentyl, 2,4-dimethylpentyl, 2,3,3,4-tetramethylpentyl, 2-methylhexyl, 3-methylhexyl, 4-methylhexyl, 2,5-dimethylhexyl, 2-methylheptyl, 2-methyloctyl, 2-trihalomethylpentyl, 2-trihalomethylhexyl, 2-trihalomethylheptyl, 2-haloethyl, 2-halopropyl, 3-halopropyl, 3-halo-2-methylpropyl, 2,3-dihalopropyl, 2-halobutyl, 3-halobutyl, 4-halobutyl, 2,3-dihalobutyl, 2,4-dihalobutyl, 3,4-dihalobutyl, 2-halo-3-methylbutyl, 2-halo-3,3-dimethylbutyl, 2-halopentyl, 3-halopentyl, 4-halopentyl, 5-halopentyl, 2,4-dihalopentyl, 2,5-dihalopentyl, 2-halo-3-methylpentyl, 2-halo-4-methylpentyl, 2-halo-3-monohalomethyl-4-methylpentyl, 2-halohexyl, 3-halohexyl, 4-halohexyl, 5-halohexyl, 6-halohexyl, 2-haloheptyl, 2-halooctyl ("halo" means fluorine, chlorine, bromine or iodine), methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethxybutyl, ethoxypentyl, ethoxyhexyl, ethoxyheptyl, ethxyoctyl, ethoxynonyl, ethoxydecyl, propoxymethyl, propoxyethyl, propoxypropyl, propoxybutyl, propoxypentyl, propoxyhexyl, propoxyheptyl, propoxyoctyl, propoxynonyl, propoxydecyl, butoxymethyl, butoxyethyl, butoxypropyl, butoxybutyl, butoxypentyl, butoxyhexyl, butoxyheptyl, butoxyoctyl, butoxynonyl, butoxydecyl, pentyloxymethyl, pentyloxyethyl, pentyloxypropyl, pentyloxybutyl, pentyloxypentyl, pentyloxyhexyl, pentyloxyoctyl, pentyloxydecyl, hexyloxymethyl, hexyloxyethyl, hexyloxypropyl, hexyloxybutyl, hexyloxypentyl, hexyloxyhexyl, hexyloxyoctyl, hexyloxynonyl, hexyloxydecyl, heptyloxymethyl, heptyloxyethyl, heptyloxypropyl, heptyloxybutyl, heptyloxypentyl, octyloxymethyl, octyloxyethyl, octyloxypropyl, decyloxymethyl, decyloxyethyl, and decyloxypropyl.

When s in the above formula is 1, the alkyl group further includes halomethyl, 1-haloethyl, 1-halopropyl, 1-halobutyl, 1-halopentyl, 1-halohexyl, 1-haloheptyl and 1-halooctyl.

In the preparation of the carboxylic acids (III) having an optically active group as $R_2$, when s is 0, the starting halides or sulfuric acid esters usable for the etherification as described in the above reaction scheme can be readily produced from the corresponding optically active alcohols. The optically active alcohols may be obtained from asymmetric reduction of the corresponding ketones. Alternatively, the alcohols may be derived from the following optically active amino acids and optically active oxyacids which occur in nature or can be obtained by optical resolution:

Alanine, valine, leucine, isoleucine, phenylalanine, serine, threonine, allothreonine, homoserine, alloisoleucine, tert-leucine, 2-aminobutyric acid, norvaline, norleucine, ornithine, lysine, hydroxylysine, phenylglycine, trifluoroalanine, aspartic acid, glutamic acid, lactic acid, mandelic acid, troipic acid, 3-hydroxybutyric acid, malic acid, tartaric acid isopropylmalic acid and the like.

When s is 1, the starting optically active acylating agent usable for the acylation as described in the above reaction scheme may be obtained by oxidation of the corresponding aminoalcohols or reductive deamination of amino acids. Alternatively, the acylating agent may be derived from the following optically active amino acids and optically active oxyacids which occur in nature or are obtained by optical resolution: alanine, valine, leucine, isoleucine, phenylalanine, serine, threonine, allothreonine, homothreonine, alloisoleucine, tert-leucine, 2-aminobutylric acid, norvaline, norleucine, ornithine, lysine, hydroxylysine, phenylglycine, trifluoroalanine, aspartic acid, glutamic acid, lactic acid, mandelic acid, tropic acid, 3-hydroxy butyric acid, malic acid, tartartic acid, isopropyl malic acid and the like.

The optically active phenols (V) can be produced, for instance, in the following manner:

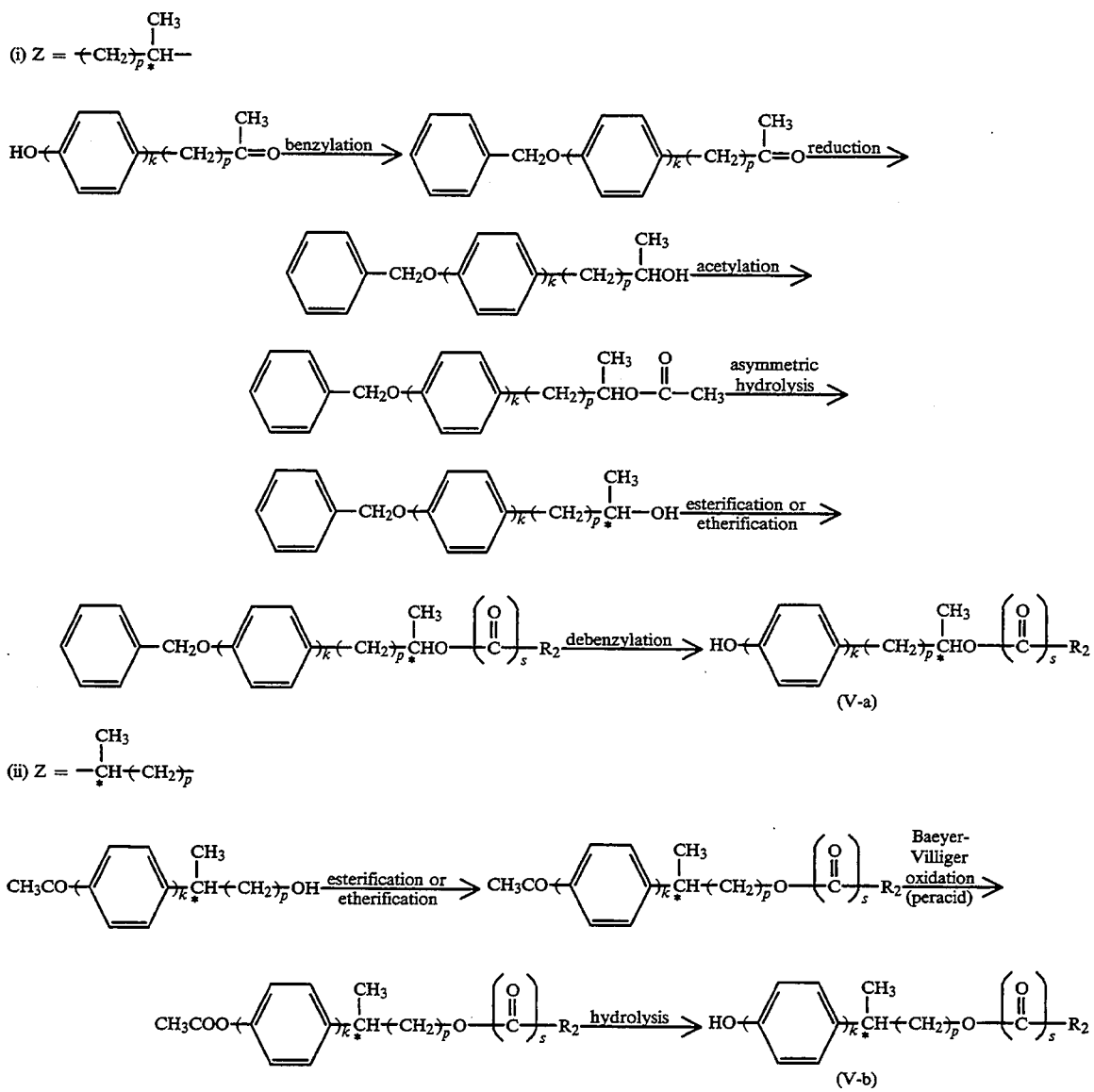

Examples of said optically active phenols (V) are as follows:

(i) 4-(2-alkoxy-1-methyl)ethylphenol, 4-(2-alkylcarbonyloxy-1-methyl)ethylphenol, 4-(2-alkoxyalkylcarbonyloxy-1-methyl)ethylphenol and 4-(2-alkoxyalkyloxy-1-methyl)ethylphenol;

4-(3-alkoxy-1-methyl)propylphenol, 4-(4-alkoxy-1-methyl)butylphenol, 4-(5-alkoxy-1-methyl)pentylphenol, 4-(6-alkoxy-1-methyl)hexylphenol and their analogues having alkyloxyalkyl, alkylcarbonyloxy or alkyloxyalkylcarbonyloxy group in place of the alkoxy;

4-substituted-4'-hydroxybiphenyls corresponding to the above 4-substituted phenols;

(ii) 4-(2-alkoxypropyl)phenol, 4-(2-alkylcarbonyloxypropyl)phenol, 4-(2-alkoxyalkyloxypropyl)phenol, 4-(2-alkoxyalkylcarbonyloxypropyl)phenol, 4-(2-alkoxypropyl)-4'-hydroxybiphenyl, 4-(2-alkylcarbonyloxypropyl)-4'-hydroxybiphenyl, 4-(2-alkoxyalkyloxypropyl)-4'-hydroxybiphenyl and 4-(2-alkoxyalkylcarbonyloxypropyl)-4'-hydroxybiphenyl;

(iii) 4-(3-alkoxybutyl)phenol, 4-(3-alkylcarbonyloxybutyl)phenol, 4-(3-alkoxyalkyloxybutyl)phenol, 4-(3-alkoxyalkylcarbonyloxybutyl)phenol, 4-(3-alkoxybutyl)-4'-hydroxybiphenyl, 4-(3-alkylcarbonyloxybutyl)-4'-hydroxybiphenyl, 4-(3-alkoxyalkyloxybutyl)-4'-hydroxybiphenyl and 4-(3-alkoxyalkylcarbonyloxybutyl)-4'-hydroxybiphenyl;

(iv) 4-(4-alkoxypentyl)phenyl, 4-(4-alkylcarbonyloxypentyl)phenol, 4-(4-alkoxyalkyloxypentyl)phenol, 4-(4-alkoxyalkylcarbonyloxypentyl)phenol, 4-(4-alkoxypentyl)-4'-hydroxybiphenyl, 4-(4-alkylcarbonyloxypentyl)-4'-hydroxybiphenyl, 4-(4-alkoxyalkyloxypentyl)-4'-hydroxybiphenyl, 4-(4-alkoxyalkylcarbonyloxypentyl)-4'-hydroxybiphenyl and their analogues having 5-alkoxyhexyl, 5-alkylcarbonyloxyhexyl, 5-alkoxyalkyloxyhexyl, 5-alkoxyalkylcarbonyloxyhexyl, 6-alkoxyheptyl, 6-alkylcarbonyloxyheptyl, 6-alkoxyalkyloxyheptyl or 6-alkoxyalkylcarbonyloxyheptyl in place of the 4-substituted pentyl.

These phenols (V) can also be used as metal phenolates.

The above alkoxy, alkylcarbonyloxy, alkoxyalkyloxy and alkoxyalkylcarbonyloxy correspond to

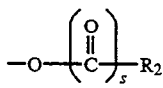

in the above-mentioned formula (V), and illustrations for the alkyl and alkoxyalkyl including optically active ones are the same as given above for the carboxylic acid (III).

The phenol (II) and the carboxylic acid compound (IV) used as another starting materials for the production of compound (I) are known and can be produced according to a method known per se.

Examples of such phenols (II) are 4-alkoxyphenol, 4-alkylphenol, 4'-alkoxy-4-hydroxybiphenyl, 4'-alkyl-4-hydroxybiphenyl, 4-alkoxycarbonylphenol, 4-alkylcarbonyloxyphenol, 4'-alkoxycarbonyl-4-hydroxybiphenyl, 4'-alkylcarbonyloxy-4-hydroxybiphenyl and their metal phenolates.

Examples of the alkyl group represented by $R_1$ are propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl and the like.

Examples of the carboxylic acid (IV) are 4-alkoxybenzoic acid, 4-alkylbenzoic acid, 4'-alkoxy-4-biphenylcarboxylic acid, 4'-alkyl-4-biphenylcarboxylic acid, 4-alkoxycarbonylbenzoic acid, 4-alkylcarbonyloxybenzoic acid, 4'-alkoxycarbonyl-4-biphenylcarboxylic acid, 4'-alkylcarbonyloxy-4-biphenylcarboxylic acid and the like. These carboxylic acids can also be utilized as acid halides such as acid chlorides and acid bromides.

The reaction between the optically active phenol (V) and the carboxylic acid compound (IV), and the optically active carboxylic acid (III) and the phenol (II) can be carried out in the presence or absence of a solvent by using a catalyst according to a conventional esterification method.

The carboxylic acid compound (IV) and the phenol (II) can be used in an amount of 1 to 4 equivalents, preferably 1 to 2 equivalents to the optically active phenol (V) and optically active carboxylic acid (III), respectively.

The solvent, if used, is inert to the reaction, and includes aliphatic or aromatic hydrocarbons, ethers, halogenated hydrocarbons and the like. Examples thereof are tetrahydrofuran, ethyl ether, acetone, methyl ethyl ketone, toluene, benzene, chlorobenzene, dichloromethane, dichloroethane, chloroform, carbon tetrachloride, dimethylformamide, hexane and the like. These solvents may be used either singly or in combination.

The catalyst includes organic or inorganic basic materials such as dimethylaminopyridine, triethylamine, tri-n-butylamine, pyridine, picoline, collidine, imidazole, sodium carbonate, sodium methylate, potassium hydrogencarbonate and the like.

Organic or inorganic acids such as toluenesulfonic acid, methanesulfonic acid, sulfuric acid, etc., are also usable as the catalyst.

The amount of the catalyst varies depending on the kind of the starting materials used, their combination with the catalyst used and the like. For example, in case of using the acid halide as the starting material, the basic material is used as the catalyst in an amount not less than one equivalent to said acid halide.

When the reaction is carried out using the free carboxylic acid and the phenol itself, a condensing agent can be used advantageously for accelerating the dehydration.

Examples thereof are organic materials such as N,N'-dicyclohexyl carbodiimide, N-cyclohexyl-N'-(4-diethylamino)cyclohexyl carbodiimide, imidazoylimidazole and the like.

In addition thereto, an organic amine such as 4-pyrollidinopyridine, pyridine, triethylamine and the like can be used.

The amount of condensing agent is usually 1 to 1.2 equivalents to the carboxylic acid.

The amount of organic amine is usually 0.01 to 0.2 equivalent to the condensing agent.

The reaction temperature is usually $-30°$ to $100°$ C. The reaction time is not particularly limited.

After the reaction is over, the reaction mixture can be subjected to separation in a conventional manner such as extraction, separation of liquid phase, concentration, etc., thereby isolating the objective optically active aromatic compound of the formula (I). If necessary, the product may be purified by column chromatography, recrystallization or the like.

Examples of the optically active aromatic compound obtained in accordance with the present invention are as follows. In these examples, ($C_{1-20}$) and ($C_{3-20}$) mean "having 1-20 carbon atoms" and "having 3-20 carbon atoms", respectively.

(i) X=—OCO—

(i-1) 4-[2-alkoxy($C_{1-20}$)-1-methyl]ethylbenzoic acid 4-[alkyl($C_{3-20}$)]phenyl ester, 4-[2-alkoxy($C_{1-20}$)-1-methyl]ethylbenzoic acid 4-[alkyl($C_{3-20}$)oxy]phenyl ester, 4-[2-alkoxy($C_{1-20}$)-1-methyl]ethylbenzoic acid 4-[alkyl($C_{3-20}$)oxycarbonyl]phenyl ester, 4-[2-alkoxy($C_{1-20}$)-1-methyl]ethylbenzoic acid 4-[alkyl($C_{3-20}$)carbonyloxy]phenyl ester, 4-[2-alkoxy($C_{1-20}$)-1-methyl]ethylbenzoic acid 4-[alkyl($C_{3-20}$)]biphenylyl ester, 4-[2-alkoxy($C_{1-20}$)-1-methyl]ethylbenzoic acid 4-[alkyl($C_{3-20}$)oxy]biphenyl ester, 4-[2-alkoxy($C_{1-20}$)-1-methyl]ethylbenzoic acid 4-[alkyl($C_{3-20}$)oxycarbonyl]biphenyle ster, 4-[2-alkoxy($C_{1-20}$)-1-methyl]ethylbenzoic acid 4-[alkyl($C_{3-20}$)carbonyloxy]biphenyle ster.

4-[2-alkoxy($C_{1-20}$)-1-methyl]ethyl-4'-biphenylcarboxylic acid 4-[alkyl($C_{3-20}$)]phenylester, 4-[2-alkoxy($C_{1-20}$)-1-methyl]ethyl-4'-biphenylcarboxylic acid 4-[alkyl($C_{3-20}$)oxy]phenylester, 4-[2-alkoxy($C_{1-20}$)-1-methyl]ethyl-4'-biphenylcarboxylic acid 4-[alkyl($C_{3-20}$)oxycarbonyl]phenylester, 4-[2-alkoxy($C_{1-20}$)-1-methyl]ethyl-4'-biphenylcarboxylic acid 4-[alkyl($C_{3-20}$)carbonyloxy]phenylester, 4-[2-alkoxy($C_{1-20}$)-1-methyl]ethyl-4'-biphenyl carboxylic acid 4-[alkyl($C_{3-20}$)]biphenylylester, 4-[2-alkoxy($C_{1-20}$)-1-methyl]ethyl-4'-biphenyl carboxylic acid 4-[alkyl($C_{3-20}$)oxy]biphenylester, 4-[2-alkoxy($C_{1-20}$)-1-methyl]ethyl-4'-biphenylcarboxylic acid 4- [alkyl($C_{3-20}$)oxycarbonyl]-biphenylylester, 4-[2-alkoxy($C_{1-20}$)-1-methyl]ethyl-4'-biphenylcarboxylic acid 4-[alkyl($C_{3-20}$)carbonyloxy]biphenylester.

Furthermore, mentioned may be made of the above-enumerated compounds where the substituent [2-alkoxy($C_{1-20}$)-1-methyl]ethyl is replaced with one of the following substituents.

[3-alkoxy($C_{1-20}$)-1-methyl]propyl group,

[4-alkoxy($C_{1-20}$)-1-methyl]butyl group,

[5-alkoxy($C_{1-20}$)-1-methyl]pentyl group,

[6-alkoxy($C_{1-20}$)-1-methyl]hexyl group, (i-2)  4-[2-alkyl($C_{1-20}$)carbonyloxy-1-methyl]ethylbenzoic acid 4-[alkyl($C_{3-20}$)]phenyle ster, 4-[2-alkyl($C_{1-20}$)carbonyloxy-1-methyl]ethyl benzoic acid 4-[alkyl($C_{3-20}$)oxy]phenyl ester, 4-[2-alkyl($C_{1-20}$)carbonyloxy-1-methyl]ethyl benzoic acid 4-[alkyl($C_{3-20}$)oxycarbonyl]phenyl ester, 4-[2-alkyl($C_{1-20}$)carbonyloxy-1-methyl]ethylbenzoic acid 4-[alkyl($C_{3-20}$)carbonyloxy]phenyl ester, 4-[2-alkyl($C_{1-20}$)carbonyloxy-1-methyl]ethylbenzoic acid 4-[alkyl($C_{3-20}$)]biphenyle ster, 4-[2-alkyl($C_{1-20}$)carbonyloxy-1-methyl]ethylbenzoic acid 4-[alkyl($C_{3-20}$)oxy]biphenylyl ester, 4-[2-alkyl($C_{1-20}$)carbonyloxy-1-methyl]ethylbenzoic acid 4-[alkyl($C_{3-20}$)oxycarbonyl]biphenylyl ester, 4-[2-alkyl($C_{1-20}$)carbonyloxy-1-methyl]ethylbenzoic acid 4-[alkyl($C_{2-30}$)carbonyloxy]biphenylyl ester.

4-[2-alkyl($C_{1-20}$)carbonyloxy-1-methyl]ethyl-4'-biphenylcarboxylic acid 4-[alkyl($C_{3-20}$)phenylester, 4-[2-alkyl($C_{1-20}$)carbonyloxy-1-methyl]ethyl-4'-biphenylcarboxylic acid 4 -[alkyl($C_{3-20}$)oxy]phenylester, 4-[2-alkyl($C_{1-20}$)carbonyloxy-1-methyl]ethyl-4'-biphenylcarboxylic acid 4-[alkyl($C_{3-20}$)oxycarbonyl]phenylester, 4-[2-alkyl($C_{1-20}$)carbonyloxy-1-methyl]ethyl-4'-biphenylcarboxylic acid 4-[alkyl($C_{3-20}$)carbonyloxy]phenylester, 4-[2-alkyl($C_{1-20}$)carbonyloxy-1-methyl]ethyl-4'-biphenylcarboxylic acid 4-[alkyl($C_{3-20}$)]biphenylester, 4-[2-alkyl($C_{1-20}$)carbonyloxy-1-methyl]ethyl-4'-biphenylcarboxylic acid 4-[alkyl($C_{3-20}$)oxy]biphenylester, 4-[2-alkyl($C_{1-20}$)carbonyloxy-1-methyl]ethyl-4'-biphenylcarboxylic acid 4-[alkyl($C_{3-20}$)oxycarbonyl]biphenylylester, 4-[2-alkyl($C_{1-20}$)carbonyloxy-1-methyl]ethyl-4'-biphenylcarboxylic acid 4-[(alkyl($C_{3-20}$)carbonyloxy]biphenylylester.

Furthermore, mention may be made of the above-enumerated compounds where the substituent, [2-alkyl($C_{1-20}$)carbonyloxy-1-methyl]ethyl is replaced with one of the following substituents.

3-[alkyl($C_{1-20}$)carbonyloxy-1-methyl]propyl group,
4-[alkyl($C_{1-20}$)carbonyloxy-1-methyl]butyl group,
5-[alkyl($C_{1-20}$)carbonyloxy-1-methyl]pentyl group,
6-[alkyl($C_{1-20}$)carbonyloxy-1-methyl]hexyl group.

(i-3)  4-[2-alkoxyalkyloxy($C_{1-20}$)-1-methyl]ethylbenzoic acid 4-[alkyl($C_{3-20}$)]phenyl ester, 4-[2-alkoxyalkyloxy($C_{1-20}$)-1-methyl]ethylbenzoic acid 4-[alkyl($C_{3-20}$)oxy]phenyl ester, 4-[2-alkoxyalkyloxy($C_{1-20}$)-1-methyl]ethylbenzoic acid 4-[alkyl($C_{3-20}$)oxycarbonyl]phenyl ester, 4-[2-alkoxyalkyloxy($C_{1-20}$)-1-methyl]ethylbenzoic acid 4-[alkyl($C_{3-20}$)carbonyloxy]phenyl ester, 4-[2-alkoxyalkyloxy($C_{1-20}$)-1-methyl]ethylbenzoic acid 4-[alkyl($C_{3-20}$)]biphenylyl ester, 4-[2-alkoxyalkyloxy($C_{1-20}$)-1-methyl]ethylbenzoic acid 4-[alkyl($C_{3-20}$)oxy]biphenylyl ester, 4-[2-alkoxyalkyloxy($C_{1-20}$)-1-methyl]ethylbenzoic acid 4-[alkyl($C_{3-20}$)oxycarbonyl]biphenylyl ester, 4-[2-alkoxyalkyloxy($C_{1-20}$)-1-methyl]ethylbenzoic acid [4-alkyl($C_{3-20}$)carbonyloxy]biphenylyl ester.

4-[2-alkoxyalkyloxy($C_{1-20}$)-1-methyl]ethyl-4'-biphenylcarboxylic acid 4-[alkyl($C_{3-20}$)]phenylester, 4-[2-alkoxyalkyloxy($C_{1-20}$)-1-methyl]ethyl-4'-biphenylcarboxylic acid 4-[alkyl($C_{3-20}$)oxy]phenylester, 4-[2-alkoxyalkyloxy($C_{1-20}$)-1-methyl]ethyl-4'-biphenylcarboxylic acid 4-[alkyl($C_{3-20}$)oxycarbonyl]phenylester, 4-[2-alkoxyalkyloxy($C_{1-20}$)-1-methyl]ethyl-4'-biphenylcarboxylic acid 4-[alkyl($C_{3-20}$)carbonyloxy]phenylester, 4-[2-alkoxyalkyloxy($C_{1-20}$)-1-methyl]ethyl-4'-biphenylcarboxylic acid 4-[alkyl($C_{3-20}$)]biphenylylester, 4-[2-alkoxyalkyloxy($C_{1-20}$)-1-methyl]ethyl-4'-biphenylcarboxylic acid 4-[alkyl($C_{3-20}$)oxy]biphenylylester, 4-[2-alkoxyalkyloxy($C_{1-20}$)-1-methyl]ethyl-4'-biphenylcarboxylic acid 4-[alkyl($C_{3-20}$)oxycarbonyl]biphenylylester, 4-[2-alkoxyalkyloxy($C_{1-20}$)-1-methyl]ethyl-4'-biphenylcarboxylic acid 4-[alkyl($C_{3-20}$)carbonyloxy]biphenylylester.

Furthermore, mention may be made of the above enumerated compounds where the substituent [2-alkoxyalkyloxy($C_{1-20}$)-1-methyl]ethyl is replaced with one of the following substituents.

[3-alkoxyalkyloxy($C_{1-20}$)-1-methyl]propyl group,
[4-alkoxyalkyloxy($C_{1-20}$)-1-methyl]butyl group,
[5-alkoxyalkyloxy($C_{1-20}$)-1-methyl]pentyl group,
[6-alkoxyalkyloxy($C_{1-20}$)-1-methyl]hexyl group, (i-4)  4-[2-alkoxyalkylcarbonyloxy($C_{1-20}$)-1-methyl]ethylbenzoic acid 4-[alkyl($C_{3-20}$)]phenylester, 4-[2-alkoxyalkylcarbonyloxy($C_{1-20}$)-1-methyl]ethylbenzoic acid 4-[alkyl($C_{3-20}$)oxy]phenylester, 4-[2-alkoxyalkylcarbonyloxy($C_{1-20}$)-1-methyl]ethylbenzoic acid 4-[alkyl($C_{3-20}$)oxycarbonyl]phenylester, 4-[2-alkoxyalkylcarbonyloxy($C_{1-20}$)-1-methyl]ethylbenzoic acid 4-[alkyl($C_{3-20}$)carbonyloxy]phenylester, 4-[2-alkoxyalkylcarbonyloxy($C_{1-20}$)-1-methyl]ethylbenzoic acid 4-[alkyl($C_{3-20}$)]biphenylylester, 4-[2-alkoxyalkylcarbonyloxy($C_{1-20}$)-1-methyl]ethylbenzoic acid 4-[alkyl($C_{3-20}$)oxy)biphenylylester, 4-[2-alkoxyalkylcarbonyloxy($C_{1-20}$)-1-methyl]ethylbenzoic acid 4-[alkyl($C_{3-20}$)oxycarbonyl]biphenylester, 4-[2-alkoxyalkylcarbonyloxy($C_{1-20}$)-1-methyl]ethylbenzoic acid 4-[alkyl($C_{3-20}$)carbonyloxy[biphenylester.

4-[2-alkoxyalkylcarbonyloxy($C_{1-20}$)-1-methyl]ethyl-4'-biphenylcarboxylic acid 4-[alkyl($C_{3-20}$)]phenylester, 4-[2-alkoxyalkylcarbonyloxy($C_{1-20}$)-1-methyl]ethyl-4'-biphenylcarboxylic acid 4-[alkyl($C_{3-20}$)oxy]phenylester, 4-[2-alkoxyalkylcarbonyloxy($C_{1-20}$)-1-methyl]ethyl-4'-biphenylcarboxylic acid 4-[alkyl($C_{3-20}$)oxycarbonyl]phenylester, 4-[2-alkoxyalkylcarbonyloxy($C_{1-20}$)-1-methyl]ethyl-4'-biphenylcarboxylic acid 4-[alkyl($C_{3-20}$)carbonyloxy]phenylester, 4-[2-alkoxyalkylcarbonyloxy($C_{1-20}$)-1-methyl]ethyl-4'-biphenylcarboxylic acid 4-[alkyl($C_{3-20}$)]biphenylylester, 4-[2-alkoxyalkylcarbonyloxy($C_{1-20}$)-1-methyl]ethyl-4'-biphenylcarboxylic acid 4-[alkyl($C_{3-20}$)oxy]biphenylylester, 4-[2-alkoxyalkylcarbonyloxy($C_{1-20}$)-1-methyl]ethyl-4'-biphenylcarboxylic acid 4-[alkyl($C_{3-20}$)oxycarbonyl]biphenylylester, 4-[2-alkoxyalkylcarbonyloxy($C_{1-20}$)-1-methyl]ethyl-4'-biphenylcarboxylic acid 4-[alkyl($C_{3-20}$)carbonyloxy]biphenylylester.

Further, mention may be made of the above enumerated compounds where the substituent [2-alkoxyalkylcarbonyloxy($C_{1-20}$)-1-methyl]ethylester is replaced with anyone of the following substituents.

[3-alkoxyalkylcarbonyloxy ($C_{1-20}$)-1-methyl]propyl group, [4-alkoxyalkylcarbonyloxy($C_{1-20}$)-1-methyl]butyl group, [5-alkoxyalkylcarbonyloxy($C_{1-20}$)-1-methyl]pentyl group, [6-alkoxyalkylcarbonyloxy($C_{1-20}$)-1-methyl]hexyl group.

(i-5) 4-[2-Alkyl($C_{1-20}$)oxypropyl]benzoic acid 4-[alkyl($C_{3-20}$)]phenyl ester, 4-[2-alkyl($C_{1-20}$)oxypropyl]benzoic acid 4-[alkyl($C_{3-20}$)oxy]phenyl ester, 4-[2-alkyl($C_{1-20}$)oxypropyl]benzoic acid 4'-[alkyl($C_{3-20}$)]biphenyl ester, 4-[2-alkyl($C_{1-20}$)oxypropyl]benzoic acid 4'-[alkyl($C_{3-20}$)oxy]biphenyl ester, 4-[2-alkyl($C_{1-20}$)oxypropyl]benzoic acid 4-[alkyl($C_{3-20}$)oxycarbonyl]phenyl ester, 4-[2-alkyl($C_{1-20}$)oxypropyl]benzoic acid 4-[alkyl($C_{3-20}$)carbonyloxy]phenyl ester, 4-[2-alkyl($C_{1-20}$)oxypropyl]benzoic acid 4'-[alkyl($C_{3-20}$)oxycarbonyl]biphenyl ester, 4-[2-alkyl($C_{1-20}$)oxypropyl]benzoic acid 4'-[alkyl($C_{3-20}$)carbonyloxybiphenylyl ester, 4-[2-alkyl($C_{1-20}$)carbonyloxypropyl]benzoic acid 4-[alkyl($C_{3-20}$)]phenyl ester, 4-[2-alkyl($C_{1-20}$)carbonyloxypropyl]benzoic acid 4-[alkyl($C_{3-20}$)oxy]phenyl ester, 4-[2-alkyl($C_{1-20}$)carbonyloxypropyl]benzoic acid 4'-[alkyl($C_{3-20}$)biphenyl ester, 4-[3-alkyl($C_{1-20}$)carbonyloxypropyl]benzoic acid 4'-[alkyl($C_{3-20}$)oxy]biphenyl ester, 4-[2-alkyl($C_{1-20}$)carbonyloxypropyl]benzoic acid [4-alkyl($C_{3-20}$)carbonyloxy]phenyl ester, 4-[2-alkyl($C_{1-20}$)carbonyloxypropyl]benzoic acid [4-alkyl($C_{3-20}$)oxycarbonyl]phenyl ester, 4-[2-alkyl($C_{1-20}$)carbonyloxypropyl]benzoic acid 4'-[alkyl($C_{3-20}$)carbonyloxy]biphenylyl ester, 4-[2-alkyl($C_{1-20}$)carbonyloxypropyl]benzoic acid 4'-[alkyl($C_{3-20}$)oxycarbonyl]biphenylyl ester, 4-[2-alkyl($C_{1-20}$)oxypropyl]-4'-biphenylcarboxylic acid 4-[alkyl($C_{3-20}$)]phenylester, 4-[2-alkyl($C_{1-20}$)oxypropyl]-4'-biphenylcarboxylic acid 4-[alkyl($C_{3-20}$)oxy]phenylester, 4-[2-alkyl($C_{1-20}$)oxypropyl]-4'-biphenylcarboxylic acid 4'-[alkyl($C_{3-20}$)]biphenylylester, 4-[2-alkyl($C_{1-20}$)oxypropyl]-4'-biphenylcarboxylic acid 4'-[alkyl($C_{3-20}$)oxy]biphenylylester, 4-[2-alkyl($C_{1-20}$)oxypropyl]-4'-biphenylcarboxylic acid 4-[alkyl($C_{3-20}$)oxycarbonyl]phenylester, 4-[2-alkyl($C_{1-20}$)oxypropyl]-4'-biphenylcarboxylic acid 4-[alkyl($C_{3-20}$)carbonyloxy]phenylester, 4-[2-alkyl($C_{1-20}$)oxypropyl]-4'-biphenylcarboxylic acid 4'-[alkyl($C_{3-20}$)oxycarbonyl]biphenylylester, 4-[2-alkyl($C_{1-20}$)oxypropyl]-4'-biphenylcarboxylic acid 4'-[alkyl($C_{3-20}$)carbonyloxy]biphenylester, 4-[2-alkyl($C_{1-20}$)carbonyloxypropyl]-4'-biphenylcarboxylic acid 4-[alkyl($C_{3-20}$)]phenylester, 4-[2-alkyl($C_{1-20}$)carbonyloxypropyl]-4'-biphenylcarboxylic acid 4-[alkyl($C_{3-20}$)oxy]phenylester, 4-[2-alkyl($C_{1-20}$)carbonyloxypropyl]-4'-biphenylcarboxylic acid 4'-[alkyl($C_{3-20}$)]biphenylylester, 4-[2-alkyl($C_{1-20}$)carbonyloxypropyl]-4'-biphenylcarboxylic acid 4'-[alkyl($C_{3-20}$)oxy]biphenylylester, 4-[2-alkyl($C_{1-20}$)carbonyloxypropyl]-4'-biphenylcarboxylic acid [4-alkyl($C_{3-20}$)carbonyloxy]phenylester, 4-[2-alkyl($C_{1-20}$)carbonyloxypropyl]-4'-biphenylcarboxylic acid [4-alkyl($C_{3-20}$)oxycarbonyl]phenylester, 4-[2-alkyl($C_{1-20}$)carbonyloxypropyl]-4'-biphenylcarboxylic acid-[alkyl($C_{3-20}$)carbonyloxy]biphenylylester, 4-[2-alkyl($C_{1-20}$)carbonyloxypropyl]-4'-biphenylcarboxylic acid 4'-[alkyl($C_{3-20}$)oxycarbonyl]biphenylylester.

4-[2-alkoxyalkyl($C_{1-20}$)oxypropyl]benzoic acid 4-[alkyl($C_{3-20}$)]phenyl ester, 4-[2-alkoxyalkyl($C_{1-20}$)oxypropyl]benzoic acid 4-[alkyl($C_{3-20}$)oxy]phenyl ester, 4-[2-alkoxyalkyl($C_{1-20}$)oxypropyl]benzoic acid 4'-[alkyl($C_{3-20}$)]biphenylyl ester, 4-[2-alkoxyalkyl($C_{1-20}$)oxypropyl]benzoic acid 4'-[alkyl($C_{3-20}$)oxy]biphenylyl ester, 4-[2-alkoxyalkyl($C_{1-20}$)oxypropyl]benzoic acid 4-[alkyl($C_{3-20}$)carbonyloxy]phenyl ester, 4-[2-alkoxyalkyl($C_{1-20}$)oxypropyl]benzoic acid 4-[alkyl($C_{3-20}$)oxycarbonyl]phenyl ester, 4-[2-alkoxyalkyl($C_{1-20}$)oxypropyl]benzoic acid 4'-[alkyl($C_{3-20}$)carbonyloxy]biphenylyl ester, 4-[2-alkoxyalkyl($C_{1-20}$)oxypropyl]benzoic acid 4'-[alkyl($C_{3-20}$)oxycarbonyl]biphenylyl ester, 4-[2-alkoxyalkyl($C_{1-20}$)carbonyloxypropyl]benzoic acid 4-[alkyl($C_{3-20}$)]phenyl ester, 4-[2-alkoxyalkyl($C_{1-20}$)carbonyloxypropyl]benzoic acid 4-[alkyl($C_{3-20}$)oxy]phenyl ester, 4-[2-alkoxyalkyl($C_{1-20}$)carbonyloxypropyl]benzoic acid 4'-[alkyl($C_{3-20}$)]biphenylyl ester, 4-[2-alkoxyalkyl($C_{1-20}$)carbonyloxypropyl]benzoic acid 4'-[alkyl($C_{3-20}$)oxy]biphenylyl ester, 4-[2-alkoxyalkyl($C_{1-20}$)carbonyloxypropyl]benzoic acid 4-[alkyl($C_{3-20}$)carbonyloxy]phenyl ester, 4-[2-alkoxyalkyl($C_{1-20}$)carbonyloxypropyl]benzoic acid 4-[alkyl($C_{3-20}$)oxycarbonyl]phenyl ester, 4-[2-alkoxyalkyl($C_{1-20}$)carbonyloxypropyl]benzoic acid 4'-[alkyl($C_{3-20}$)carbonyloxy]biphenylyl ester, 4-[2-alkoxyalkyl($C_{1-20}$)carbonyloxypropyl]benzoic acid 4'-[alkyl($C_{3-20}$)oxycarbonyl]biphenylyl ester.

4-[2-alkoxyalkyl($C_{1-20}$)oxypropyl]-4'-biphenylcarboxylic acid 4-[alkyl($C_{3-20}$)]phenylester, 4-[2-alkoxyalkyl($C_{1-20}$)oxypropyl]-4'-biphenylcarboxylic acid 4-[alkyl($C_{3-20}$)oxy]phenylester, 4-[2-alkoxyalkyl($C_{1-20}$)oxypropyl]-4'-biphenylcarboxylic acid 4'-[alkyl($C_{3-20}$)]biphenylylester, 4-[2-alkoxyalkyl($C_{1-20}$)oxypropyl]-4'-biphenylcarboxylic acid 4'-[alkyl($C_{3-20}$)oxy)biphenylylester, 4-[2-alkoxyalkyl($C_{1-20}$)oxypropyl]-4'-biphenylcarboxylic acid 4-[alkyl($C_{3-20}$)carbonyloxy]phenylester, 4-[2-alkoxyalkyl($C_{1-20}$)oxypropyl]-4'-biphenylcarboxylic acid 4-[alkyl($C_{3-20}$)oxycarbonyl]phenylester, 4-[2-alkoxyalkyl($C_{1-20}$)oxypropyl]-4'-biphenylcarboxylic acid 4'-[alkyl($C_{3-20}$)carbonyloxy]biphenylylester, 4-[2-alkoxyalkyl($C_{1-20}$)oxypropyl]-4'-biphenylcarboxylic acid 4'-[alkyl($C_{3-20}$)oxycarbonyl]biphenylylester, 4-[2-alkoxyalkyl($C_{1-20}$)carbonyloxypropyl]-4'-biphenylcarboxylic acid 4-[alkyl($C_{3-20}$)]phenylester, 4-[2-alkoxyalkyl($C_{1-20}$)carbonyloxypropyl]-4'-biphenylcarboxylic acid 4-[alkyl($C_{3-20}$)oxy]phenylester, 4-[2-alkoxyalkyl($C_{1-20}$)carbonyloxypropyl]-4'-biphenylcarbonylic acid 4'-[alkyl($C_{3-20}$)]biphenylylester, 4-[2-alkoxyalkyl($C_{1-20}$)carbonyloxypropyl]-4'-biphenylcarboxylic acid 4'-[alkyl($C_{3-20}$)oxy]biphenylester, 4-[2-alkoxyalkyl($C_{1-20}$)carbonyloxypropyl]-4'-biphenylcarboxylic acid 4-[alkyl($C_{3-20}$)carbonyloxy]phenylester, 4-[2-alkoxylalkyl($C_{1-20}$)carbonyloxypropyl]-4'-biphenylcarboxylic acid 4-[alkyl($C_{3-20}$)oxycarbonyl]phenylester, 4-[2-alkoxyalkyl($C_{1-20}$)carbonyloxypropyl]-4'-biphenylcarboxylic acid 4'-[alkyl($C_{3-20}$)carbonyloxy]biphenylester, 4-[2-alkoxyalkyl($C_{1-20}$)carbonyloxypropyl]-4'-biphenylcarboxylic acid 4'-[alkyl($C_{3-20}$)oxycarbonyl]biphenylylester.

(i-6) 4-[3-alkyl($C_{1-20}$)oxybutyl]benzoic acid 4-[alkyl($C_{3-20}$)]phenyl ester, 4-[3-alkyl($C_{1-20}$)oxybutyl]benzoic acid 4-[alkyl($C_{3-20}$)oxy]phenyl ester, 4-[3-alkyl($C_{1-20}$)oxybutyl]benzoic acid 4'-[alkyl($C_{3-20}$)]biphenylyl ester, 4-[3-alkyl($C_{1-20}$)oxybutyl]benzoic acid 4'-[alkyl($C_{3-20}$)oxy]biphenylyl ester, 4-[3-alkyl($C_{1-20}$)oxybutyl]benzoic acid 4-[alkyl($C_{3-20}$)oxycarbonyl]phenyl ester, 4-[3-alkyl($C_{1-20}$)oxybutyl]benzoic acid 4-[alkyl($C_{3-20}$)carbonyloxy]phenyl ester, 4-[3-alkyl($C_{1-20}$)oxybutyl]benzoic acid 4'-[alkyl($C_{3-20}$)oxycarbonyl]biphenylyl ester, 4-[3-alkyl($C_{1-20}$)oxybutyl]benzoic acid 4'-[alkyl($C_{3-20}$)carbonyloxy]biphenylyl ester, 4-[3-alkyl($C_{1-20}$)carbonyloxybutyl]benzoic acid 4-[alkyl($C_{3-20}$)]phenyl ester, 4-[3-alkyl($C_{1-20}$)carbonyloxybutyl]benzoic acid 4-[alkyl($C_{3-20}$)oxy]phenyl ester, 4-[3-alkyl($C_{1-20}$)carbonyloxybutyl]benzoic acid 4'-[alkyl($C_{3-20}$)]biphenyl ester, 4-[3-alkyl($C_{1-20}$)carbonyloxybutyl]benzoic acid 4'-[alkyl($C_{3-20}$)oxyl]biphenyl ester, 4-[3-alkyl($C_{1-20}$)carbonyloxybutyl]benzoic acid [4-alkyl($C_{3-20}$)carbonyloxy]phenyl ester, 4-[3-alkyl($C_{1-20}$)carbonyloxybutyl]benzoic acid [4-alkyl($C_{3-20}$)]oxycarbonyl]phenyl ester, 4-[3-alkyl($C_{1-20}$)carbonyloxybutyl]benzoic acid 4'-[alkyl($C_{3-20}$)carbonyloxy]biphenylyl ester, 4-[3-alkyl($C_{1-20}$)carbonyloxybutyl]benzoic acid 4'-[alkyl($C_{3-20}$)oxycarbonyl]biphenylyl ester, 4-[3-alkyl($C_{1-20}$)oxybutyl]-4'-biphenylcarboxylic acid 4-[alkyl($C_{3-20}$)]phenylester, 4-[3-alkyl($C_{1-20}$)oxybutyl]-4'-biphenylcarboxylic acid 4-[alkyl($C_{3-20}$)oxy]phenylester, 4-[3-alkyl($C_{1-20}$)oxybutyl]-4'-biphenylcarboxylic acid 4'-[alkyl($C_{3-20}$)]biphenylylester, 4-[3-alkyl($C_{1-20}$)oxybutyl]-4'-biphenylcarboxylic acid 4'-[alkyl($C_{3-20}$)oxy]biphenylylester, 4-[3-alkyl($C_{1-20}$)oxybutyl]-4'-biphenylcarboxylic acid 4-[alkyl($C_{3-20}$)oxycarbonyl]phenylester, 4-[3-alkyl($C_{1-20}$)oxybutyl]-4'-biphenylcarboxylic acid 4-[alkyl($C_{3-20}$)carbonyloxy]phenylester, 4-[3-alkyl($C_{1-20}$)oxybutyl]-4'-biphenylcarboxylic acid 4'-[alkyl($C_{3-20}$)oxycarbonyl]biphenylylester, 4-[3-alkyl($C_{1-20}$)oxybutyl]-4'-biphenylcarboxylic acid 4'-[alkyl($C_{3-20}$)carbonyloxy]biphenylylester, 4-[3-alkyl($C_{1-20}$)carbonyloxybutyl]-4'-biphenylcarboxylic acid 4-[alkyl($C_{3-20}$)]phenylester, 4-[3-alkyl($C_{1-20}$)carbonyloxybutyl]-4'-biphenylcarboxylic acid 4-[alkyl($C_{3-20}$)oxy]phenylester, 4-[3-alkyl($C_{1-20}$)carbonyloxybutyl]-4'-biphenylcarboxylic acid 4'-[alkyl($C_{3-20}$)]biphenylylester, 4-[3-alkyl($C_{1-20}$)carbonyloxybutyl]-4'-biphenylcarboxylic acid 4'-[alkyl($C_{3-20}$)oxy]biphenylylester, 4-[3-alkyl($C_{1-20}$)carbonyloxybutyl]-4'-biphenylcarboxylic acid [4-alkyl($C_{3-20}$)carbonyloxy]phenylester, 4-[3-alkyl($C_{1-20}$)carbonyloxybutyl]-4'-biphenylcarboxylic acid [4-alkyl($C_{3-20}$)oxycarbonyl]phenylester, 4-[3-alkyl($C_{1-20}$)carbonyloxybutyl]-4'-biphenylcarboxylic acid 4'-[alkyl($C_{3-20}$)carbonyloxy]biphenylester, 4-[3-alkyl($C_{1-20}$)carbonyloxybutyl]-4'-biphenylcarboxylic acid 4'-[alkyl($C_{3-20}$)oxycarbonyl]biphenylester.

4-[3-alkoxyalkyl($C_{1-20}$)oxybutyl]benzoic acid 4-[alkyl($C_{3-20}$)]phenyl ester, 4-[3-alkoxyalkyl($C_{1-20}$)oxybutyl]benzoic acid 4-[alkyl($C_{3-20}$)oxy]phenyl ester, 4-[3-alkoxyalkyl($C_{1-20}$)oxybutyl]benzoic acid 4'-[alkyl($C_{3-20}$)]biphenylyl ester, 4-[3-alkoxyalkyl($C_{1-20}$)oxybutyl]benzoic acid 4'-[alkyl($C_{3-20}$)oxy]biphenylyl ester, 4-[3-alkoxyalkyl($C_{1-20}$)oxybutyl]benzoic acid 4-[alkyl($C_{3-20}$)carbonyloxy]phenyl ester, 4-[3-alkoxyalkyl($C_{1-20}$)oxybutyl]benzoic acid 4-[alkyl($C_{3020}$)oxycarbonyl]phenyl ester, 4-[3-alkoxyalkyl($C_{1-20}$)oxybutyl]benzoic acid 4'-[alkyl($C_{3-20}$)carbonyloxy]biphenylyl ester, 4-[3-alkoxyalkyl($C_{1-20}$)oxybutyl]benzoic acid 4'-[alkyl($C_{3-20}$)oxycarbonyl]biphenylyl ester, 4-[3-alkoxyalkyl($C_{1-20}$)carbonyloxybutyl]benzoic acid 4-[alkyl($C_{3-20}$)]phenyl ester, 4-[3-alkoxyalkyl($C_{1-20}$)carbonyloxybutyl]benzoic acid 4-[alkyl($C_{3-20}$)oxy]phenyl ester, 4-[3-alkoxyalkyl($C_{1-20}$)carbonyloxybutyl]benzoic acid 4'-[alkyl($C_{3-20}$)]biphenylyl ester, 4-[3-alkoxyalkyl($C_{1-20}$)carbonyloxybutyl]benzoic acid 4'-[alkyl($C_{3-20}$)oxy]biphenylyl ester, 4-[3-alkoxyalkyl($C_{1-20}$)carbonyloxybutyl]benzoic acid 4-[alkyl($C_{3-20}$)carbonyloxy]phenyl ester, 4-[3-alkoxyalkyl($C_{1-20}$)carbonyloxybutyl]benzoic acid 4-[alkyl($C_{3-20}$)oxycarbonyl]phenyl ester, 4-[3-alkoxyalkyl($C_{1-20}$)carbonyloxybutyl]benzoic acid 4'-[alkyl($C_{3-20}$)carbonyloxy]biphenylyl ester, 4-[3-alkoxyalkyl($C_{1-20}$)carbonyloxybutyl]benzoic acid 4'-[alkyl($C_{3-20}$)oxycarbonyl]biphenylyl ester.

4-[3-alkoxyalkyl($C_{1-20}$)oxybutyl]-4'-biphenylcarboxylic acid 4-[alkyl($C_{3-20}$)phenylester, 4-[3-alkoxyalkyl($C_{1-20}$oxybutyl]-4'-biphenylcarboxylic acid 4-[alkyl($C_{3-20}$)oxy]phenylester, 4-[3-alkoxyalkyl($C_{1-20}$)oxybutyl]-4'-biphenylcarboxylic acid 4'-[alkyl($C_{3-20}$)]biphenylylester, 4-[3-alkoxyalkyl($C_{1-20}$)oxybutyl]-4'-biphenylcarboxylic acid 4'-[alkyl($C_{3-20}$)oxy]biphenylylester, 4-[3-alkoxyalkyl($C_{1-20}$)oxybutyl]-4'-biphenylcarboxylic acid 4-[alkyl($C_{3-20}$)carbonyloxy]phenylester, 4-[3-alkoxyalkyl($C_{1-20}$)oxybutyl]-4'-biphenylcarboxylic acid 4-[alkyl($C_{3-20}$)oxycarbonyl]phenylester, 4-[3-alkoxyalkyl($C_{1-20}$)oxybutyl]-4-biphenylcarboxylic acid 4'-[alkyl($C_{3-20}$)carbonyloxy]biphenylester, 4-[3-alkoxyalkyl($C_{1-20}$)oxybutyl]-4'-biphenylcarboxylic acid 4'-[alkyl($C_{3-20}$)oxycarbonyl]biphenylylester, 4-[3-alkoxyalkyl($C_{1-20}$)carbonyloxybutyl]-4'-biphenylcarboxylic acid 4-[alkyl($C_{3-20}$)]phenylester, 4-[3-alkoxyalkyl($C_{1-20}$)carbonyloxybutyl]-4'-biphenylcarboxylic acid 4-[alkyl($C_{3-20}$)oxy]phenylester, 4-[3-alkoxyalkyl($C_{1-20}$)carbonyloxybutyl]-4'-biphenylcarboxylic acid 4'-[alkyl($C_{3-20}$)]biphenylylester, 4-[3-alkoxyalkyl($C_{1-20}$)carbonyloxybutyl]-4'-biphenylcarboxylic acid 4'-[alkyl($C_{3-20}$)oxy]biphenylylester, 4-[3-alkoxyalkyl($C_{1-20}$)carbonyloxybutyl]-4'-biphenylcarboxylic acid 4-[alkyl($C_{3-20}$)carbonyloxy]phenylester, 4-[3-alkoxyalkyl($C_{1-20}$)carbonyloxybutyl]-4'-biphenylcarboxylic acid 4-[allyl($C_{3-20}$)oxycarbonyl]phenylester, 4-[3-alkoxyalkyl($C_{1-20}$)carbonyloxybutyl]-4'-biphenylcarboxylic acid 4'-[alkyl($C_{3-20}$)carbonyloxy]biphenylester, 4-[3-alkoxyalkyl($C_{1-20}$)carbonyloxybutyl]-4'-biphenylcarboxylic acid 4'-[alkyl($C_{3-20}$)oxycarbonyl]biphenylester.

(i-7) 4-[4-alkyl($C_{1-20}$)oxypentyl]benzoic acid 4-[alkyl($C_{3-20}$)]phenyl ester, 4-[4-alkyl($C_{1-20}$)oxypentyl]benzoic acid 4-[alkyl($C_{3-20}$)oxy]phenyl ester, 4-[4-alkyl($C_{1-20}$)oxypentyl]benzoic acid 4'-[alkyl($C_{3-20}$)]biphenylyl ester, 4-[4-alkyl($C_{1-20}$)oxypentyl]benzoic acid 4'-[alkyl($C_{3-20}$)oxy]biphenylyl ester, 4-[4-alkyl($C_{1-20}$)oxypentyl]benzoic acid 4-[alkyl($C_{3-20}$)oxycarbonyl]phenyl ester, 4-[4-alkyl($C_{1-20}$)oxypentyl]benzoic acid 4-[alkyl($C_{3-20}$)carbonyloxy]phenyl ester, 4-[4-alkyl($C_{1-20}$)oxypentyl]benzoic acid 4'-[alkyl($C_{3-20}$)oxycarbonyl]biphenylyl ester, 4-[4-alkyl($C_{1-20}$)oxypentyl]benzoic acid 4'-[alkyl($C_{3-20}$)carbonyloxy]biphenylyl ester, 4-[4-alkyl($C_{1-20}$)carbonyloxypentyl]benzoic acid 4-[alkyl($C_{3-20}$)]phenyl ester, 4-[4-alkyl($C_{1-20}$)carbonyloxypentyl]benzoic acid 4-[alkyl($C_{3-20}$)oxy]phenyl ester, 4-[4-alkyl($C_{1-20}$)carbonyloxypentyl]benzoic acid 4'-alkyl($C_{3-20}$)]biphenyl ester, 4-[4-alkyl($C_{1-20}$)carbonyloxypentyl]benzoic acid 4'-[alkyl($C_{3-20}$)oxy]biphenyl ester, 4-[4-alkyl($C_{1-20}$)carbonyloxypentyl]benzoic acid [4-alkyl($C_{3-20}$)carbonyloxy]phenyl ester, 4-[4-alkyl($C_{1-20}$)carbonyloxypentyl]benzoic acid [4-alkyl($C_{3-20}$)oxycarbonyl]phenyl ester, 4-[4-alkyl($C_{1-20}$)carbonyloxypentyl]benzoic acid 4'-[alkyl($C_{3-20}$)carbonyloxy]biphenylyl ester, 4-[4-alkyl($C_{1-20}$)carbonyloxypentyl]benzoic acid 4'-[alkyl($C_{3-20}$)oxycarbonyl]biphenylyl ester.

4-[4-alkyl($C_{1-20}$)oxypentyl]-4'-biphenylcarboxylic acid 4-[alkyl($C_{3-20}$)]phenylester, 4-[4-alkyl($C_{1-20}$)oxypentyl]-4'-biphenylcarboxylic acid 4-[alkyl($C_{3-20}$)oxy]phenylester, 4-[4-alkyl($C_{1-20}$)oxypentyl]-4'-biphenylcarboxylic acid 4'-[alkyl($C_{3-20}$)oxy]biphenylylester, 4-[4-alkyl($C_{1-20}$)oxypentyl]-4'-biphenylcarboxylic acid 4'-[alkyl($C_{3-20}$)]biphenylylester, 4-[4-alkyl($C_{1-20}$)oxypentyl]-4'-biphenylcarboxylic acid 4-[alkyl ($C_{3-20}$)oxycarbonyl]phenylester, 4-[4-alkyl($C_{1-20}$)oxypentyl]-4'-biphenylcarboxylic acid 4-[alkyl($C_{3-20}$)carbonyloxy]phenylester, 4-[4-alkyl($C_{1-20}$)oxypentyl]-4'-biphenylcarboxylic acid 4'-[alkyl($C_{3-20}$)oxycarbonyl]biphenylylester, 4-[4-alkyl($C_{1-20}$)oxypentyl]-4'-biphenylcarboxylic acid 4'-[alkyl($C_{3-20}$)carbonyloxy]biphenylylester, 4-[4-alkyl($C_{1-20}$)carbonyloxypentyl]-4'-biphenylcarboxylic acid 4-[alkyl($C_{3-20}$)]phenylester, 4-[4-alkyl($C_{1-20}$)carbonyloxypentyl]-4'-biphenylcarboxylic acid 4'-[alkyl($C_{3-20}$)oxy]phenylester, 4-[4-alkyl($C_{1-20}$)carbonyloxypentyl]-4'-biphenylcarboxylic acid 4'-[alkyl($C_{3-20}$)]biphenylylester, 4-[4-alkyl($C_{1-20}$)carbonyloxypentyl]-4'-biphenylcarboxylic acid 4'-[alkyl($C_{3-20}$)oxy]biphenylylester, 4-[4-alkyl($C_{1-20}$)carbonyloxypentyl]-4'-biphenylcarboxylic acid [4-alkyl($C_{3-20}$)carbonyloxy]phenylester, 4-[4-alkyl($C_{1-20}$)carbonyloxypentyl]-4'-biphenylcarboxylic acid [4-alkyl($C_{3-20}$)oxycarbonyl]phenylester, 4-[4-alkyl($C_{1-20}$)carbonyloxypentyl]-4'-biphenylcarboxylic acid 4'-[alkyl($C_{3-20}$)carbonyloxy]biphenylylester, 4-[4-alkyl($C_{1-20}$)carbonyloxypentyl]-4'-biphenylcarboxylic acid 4'-[alkyl($C_{3-20}$)oxycarbonyl]biphenylylester.

4-[4-alkoxyalkyl($C_{1-20}$)oxypentyl]benzoic acid 4-[alkyl($C_{3-20}$)]phenyl ester, 4-[4-alkoxyalkyl($C_{1-20}$)oxypentyl]benzoic acid 4-[alkyl($C_{3-20}$)oxy]phenyl ester, 4-[alkoxyalkyl($C_{1-20}$)oxypentyl]benzoic acid 4'-[alkyl($C_{3-20}$)]biphenylyl ester, 4-[4-alkoxyalkyl($C_{1-20}$)oxypentyl]benzoic acid 4'-[alkyl($C_{3-20}$)oxy]biphenyl ester, 4-[4-alkoxyalkyl($C_{1-20}$)oxypentyl]benzoic acid 4-[alkyl($C_{3-20}$)carbonyloxy]phenyl ester, 4-[4-alkoxyalkyl($C_{1-20}$)oxypentyl]benzoic acid 4-[alkyl($C_{3-20}$)oxycarbonyl]phenyl ester, 4-[4-alkoxyalkyl($C_{1-20}$)oxypentyl]benzoic acid 4'-[alkyl($C_{3-20}$)carbonyloxy]biphenylyl ester, 4-[4-alkoxyalkyl($C_{1-20}$)oxypentyl]benzoic acid 4'-[alkyl($C_{3-20}$)oxycarbonyl]biphenylyl ester, 4-[4-alkoxyalkyl($C_{1-20}$)carbonyloxypentyl]benzoic acid 4-[alkyl($C_{3-20}$)]phenyl ester, 4-[4-alkoxyalkyl($C_{1-20}$)carbonyloxypentyl]benzoic acid 4-[alkyl($C_{3-20}$)oxy]phenyl ester, 4-[4-alkoxyalkyl($C_{1-20}$)carbonyloxypentyl]benzoic acid 4'-[alkyl($C_{3-20}$)]biphenylyl ester, 4-[4-alkoxyalkyl($C_{1-20}$)carbonyloxypentyl]benzoic acid 4'-[alkyl($C_{3-20}$)oxy]biphenylyl ester, 4-[4-alkoxyalkyl($C_{1-20}$)carbonyloxypentyl]benzoic acid 4-[alkyl($C_{3-20}$)carbonyloxy]phenyl ester, 4-[4-alkoxyalkyl($C_{1-20}$)carbonyloxypentyl]benzoic acid 4-[alkyl($C_{3-20}$)oxycarbonyl]phenyl ester, 4-[4-alkoxyalkyl($C_{1-20}$)carbonyloxypentyl]benzoic acid 4'-[alkyl($C_{3-20}$)carbonyloxy]biphenylyl ester, 4-[4-alkoxyalkyl($C_{1-20}$)carbonyloxypentyl]benzoic acid 4'-[alkyl($C_{3-20}$)oxycarbonyl]biphenylyl ester.

4-[4-alkoxyalkyl($C_{1-20}$)oxypentyl]-4'-biphenylcarboxylic acid 4-[alkyl($C_{3-20}$)]phenylester, 4-[4-alkoxyalkyl($C_{1-20}$)oxypentyl]-4'-biphenylcarboxylic acid 4-[alkyl($C_{3-20}$)oxy]phenylester, 4-[4-alkoxyalkyl($C_{1-20}$)oxypentyl]-4'-biphenylcarboxylic acid 4'-[alkyl($C_{3-20}$)biphenylylester, 4-[4-alkoxyalkyl($C_{1-20}$)oxypentyl]-4'-biphenylcarboxylic acid 4'-[alkyl($C_{3-20}$)oxy]biphenylylester, 4-[4-alkoxyalkyl($C_{1-20}$)oxypentyl]-4'-biphenylcarboxylic acid, 4-[alkyl($C_{3-20}$)carbonyloxy]phenylester, 4-[4-alkoxyalkyl($C_{1-20}$)oxypentyl]-4'-biphenylcarboxylic acid 4-[alkyl($C_{3-20}$)oxycarbonyl]phenylester, 4-[4-alkoxyalkyl($C_{1-20}$)oxypentyl]-4'-biphenylcarboxylic acid 4'-[alkyl($C_{3-20}$)carbonyloxy]biphenylylester, 4-[4-alkoxyalkyl($C_{1-20}$)oxypentyl]-4'-biphenylcarboxylic acid 4'-[alkyl($C_{3-20}$)oxycarbonyl]biphenylylester, 4-[4-alkoxyalkyl($C_{1-20}$)carbonyloxypentyl]-4'-biphenylcarboxylic acid 4-[alkyl($C_{3-20}$)]phenylester, 4-[4-alkoxyalkyl($C_{1-20}$)carbonyloxypentyl]-4'-biphenylcarboxylic acid 4-[alkyl($C_{3-20}$)oxy]phenylester, 4-[4-alkoxyalkyl($C_{1-20}$)carbonyloxypentyl]-4'-biphenylcarboxylic acid 4'-[alkyl($C_{3-20}$)]biphenylylester, 4-[4-alkoxyalkyl($C_{1-20}$)carbonyloxypentyl]-4'-biphenylcarboxylic acid 4'-[alkyl($C_{3-20}$)oxy]biphenylylester, 4-[4-alkoxyalkyl($C_{1-20}$)carbonyloxypentyl]-4'-biphenylcarboxylic acid 4-[alkyl($C_{3-20}$)carbonyloxy]phenylester, 4-[4-alkoxyalkyl($C_{1-20}$)carbonyloxypentyl]-4'-biphenylcarboxylic acid 4-[alkyl($C_{3-20}$)oxycarbonyl]phenylester, 4-[4-alkoxyalkyl($C_{1-20}$)carbonyloxypentyl]-4'-biphenylcarboxylic acid 4'-[alkyl($C_{3-20}$)carbonyloxy]biphenylylester, 4-[2-alkoxyalkyl($C_{1-20}$)carbonyloxypentyl]-4'-biphenylcarboxylic acid 4'-[alkyl($C_{3-20}$)oxycarbonyl]biphenylylester.

In addition to the above exemplified compounds, there can be exemplified those compounds where the 4-[4-alkyloxy($C_{1-20}$)pentyl], 4-[4-alkylcarbonyloxy($C_{1-20}$)-pentyl], 4-[4-alkoxyalkyloxy($C_{1-20}$)pentyl], or 4-[4-alkoxyalkylcarbonyloxy($C_{1-20}$) pentyl] in the above examples is replaced with 4-[5-alkyloxy($C_{1-20}$)hexyl], 4-[5-alkylcarbonyloxy($C_{1-20}$)hexyl], 4-[5-alkoxyalkyloxy-($C_{1-20}$)hexyl] or 4-[5-alkoxyalkylcarbonyloxy($C_{1-20}$)-hexyl], respectively, or with 4-[6-alkyloxy($C_{1-20}$)heptyl], 4-[6-alkylcarbonyloxy($C_{1-20}$)heptyl], 4-[6-alkoxyalkyloxy-($C_{1-20}$)heptyl], or 4-[6-alkoxyalkylcarbonyloxy($C_{1-20}$)-heptyl], respectively.

The above exemplified alkoxyalkyl and alkyl may be substituted with halogen atom and these alkoxyalkyl and alkyl may be branched alkoxyalkyl and alkyl.

Further, these alkoxyalkyl and alkyl may be optically active alkoxyalkyl and alkyl.

Examples of these alkyl and alkoxyalkyl are those as exemplified herebefore (substituent $R_2$).

(ii) X=—COO—

(ii-1) 4-[2-alkoxy($C_{1-20}$)-1-methyl]ethylphenyl 4-[alkyl($C_{3-20}$)]benzoic acid ester, 4-[2-alkoxy($C_{1-20}$)-1-methyl]ethylphenyl 4-[alkyl($C_{3-20}$)oxy]benzoic acid ester, 4-[2-alkoxy($C_{1-20}$)-1-methyl]ethylphenyl 4-[alkyl($C_{3-20}$)oxycarbonyl]benzoic acid ester, 4-[2-alkoxy($C_{1-20}$)-1-methyl]ethylphenyl 4-[alkyl($C_{3-20}$)carbonyloxy]benzoic acid ester, 4-[2-alkoxy($C_{1-20}$)-1-methyl]ethylphenyl 4-[alkyl($C_{3-20}$)]-4'-biphenylcarboxylic acid ester, 4-[2-alkoxy($C_{1-20}$)-1-methyl]ethylphenyl 4-[alkyl($C_{3-20}$)oxy]-4'-biphenylcarboxylic acid ester, 4-[2-alkoxy($C_{1-20}$)-1-methyl]ethylphenyl 4-[alkyl-($C_{3-20}$)oxycarbonyl]-4'-biphenylcarboxylic acid ester, 4-[2-alkoxy($C_{1-20}$)-1-methyl]ethylphenyl 4-[alkyl-($C_{3-20}$)carbonyloxy]-4'-biphenylcarboxylic acid ester, 4-[2-alkoxy($C_{1-20}$)-1-methyl]ethyl-4'-biphenylyl 4-[alkyl($C_{3-20}$)]benzoic acid ester, 4-[2-alkoxy($C_{1-20}$)-1-methyl]ethyl-4'-biphenylyl 4-[alkyl($C_{3-20}$)oxy]benzoic acid ester, 4-[2-alkoxy($C_{1-20}$)-1-methyl]ethyl-4'-biphenylyl 4-[alkyl($C_{3-20}$)oxycarbonyl]benzoic acid ester, 4-[2-alkoxy($C_{1-20}$)-1-methyl]ethyl-4'-biphenylyl 4[alkyl($C_{3-20}$)carbonyloxy]benzoic acid ester, 4-[2-alkoxy($C_{1-20}$)-1-methyl]ethyl-4'-biphenylyl 4-[alkyl($C_{3-20}$)]-4'-biphenylcarboxylic acid ester, 4-[2-alkoxy($C_{1-20}$)-1-methyl]ethyl-4'-biphenylyl 4-[alkyl($C_{3-20}$)oxy]-4'-biphenylcarboxylic acid ester, 4-[2-alkoxy($C_{1-20}$)-1-methyl]ethyl-4-biphenylyl 4-[alkyl($C_{3-20}$)oxycarbonyl]-4'-biphenylcarboxylic acid ester, 4-[2-alkoxy($C_{1-20}$) -1-methyl]ethyl-4'-biphenylyl 4-[alkyl($C_{3-20}$)carbonyloxy]-4'-biphenylcarboxylic acid ester.

Further, mention may be made of the above enumerated compounds where the substituent [2-alkoxy($C_{1-20}$)-1-methyl]ethyl is replaced with one of the following substituents:

[3-alkoxy($C_{1-20}$)-1-methyl]propyl group,
[4-alkoxy($C_{1-20}$)-1-methyl]butyl group,
[5-alkoxy($C_{1-20}$)-1-methyl]pentyl group,
[6-alkoxy($C_{1-20}$)-1-methyl]hexyl group.

(ii-2) 4-[2-alkyl($C_{1-20}$)carbonyloxy-1-methyl]ethylphenyl 4-[alkyl($C_{3-20}$)]benzoic acid ester, 4-[2-alkyl($C_{1-20}$)carbonyloxy-1-methyl]ethylphenyl 4-[alkyl($C_{3-20}$)oxy]benzoic acid ester, 4-[2-alkyl($C_{1-20}$)carbonyloxy-1-methyl]ethylphenyl 4-[alkyl($C_{3-20}$)oxycarbonyl]benzoic acid ester, 4-[2-alkyl($C_{1-20}$)carbonyloxy-1-methyl]ethylphenyl 4-[alkyl($C_{3-20}$)carbonyloxy]benzoic acid ester, 4-[2-alkyl($C_{1-20}$)carbonyloxy-1-methyl]ethylphenyl 4-[alkyl($C_{3-20}$)]-4'-biphenylcarboxylic acid ester, 4-[2-alkyl($C_{1-20}$)carbonyloxy-1-methyl]ethylphenyl 4-[alkyl($C_{3-20}$)oxy]-4'-biphenylcarboxylic acid ester, 4-[2-alkyl($C_{1-20}$)carbonyloxy-1-methyl]ethylphenyl 4-[alkyl($C_{3-20}$)oxycarbonyl]-4'-biphenylcarboxylic acid ester, 4-[2-alkyl($C_{1-20}$)carbonyloxy-1-mrthyl]ethylphenyl 4-[alkyl($C_{3-20}$)carbonyloxy]-4'-biphenylcarboxylic acid ester 4-[2-alkyl($C_{1-20}$)carbonyloxy-1-methyl]ethyl-4'-biphenylyl 4-[alkyl($C_{3-20}$)]benzoic acid ester, 4-[2-alkyl($C_{1-20}$)carbonyloxy-1-methyl]ethyl-4'-biphenylyl 4-[alkyl($C_{3-20}$)oxy]benzoic acid ester, 4-[2-alkyl($C_{1-20}$)carbonyloxy-1-methyl]ethyl-4'-biphenylyl 4-[alkyl($C_{3-20}$)oxycarbonyl]benzoic acid ester, 4-[2-alkyl($C_{1-20}$)carbonyloxy-1-methyl]ethyl-4'-biphenylyl 4-[alkyl($C_{3-20}$)carbonyloxy]benzoic acid ester, 4-[2-alkyl($C_{1-20}$)carbonyloxy-1-methyl]ethyl-4'-biphenylyl 4-[alkyl($C_{3-20}$)]-4'-biphenylcarboxylic acid ester, 4-[2-alkyl($C_{1-20}$)carbonyloxy-1-methyl]ethyl-4'-biphenylyl 4-[alkyl($C_{3-20}$)oxy]-4'-biphenylcarboxylic acid ester, 4-[2-alkyl($C_{1-20}$)carbonyloxy-1-methyl]ethyl-4'-biphenylyl 4-[alkyl($C_{3-20}$)oxycarbonyl]-4'-biphenylcarboxylic acid ester, 4-[2-alkyl($C_{1-20}$)carbonyloxy-1-methyl]ethyl-4'-biphenylyl 4-[alkyl($C_{3-20}$)carbonyloxy]-4'-biphenylcarboxylic acid ester.

Further, mention may be made the above enumerated compounds where the substituent [2-alkyl($C_{1-20}$)carbonyloxy-1-methyl]ethyl is replaced with one of the following substituents:

[3-alkyl($C_{1-20}$)carbonyloxy-1-methyl]propyl group,
[4-alkyl($C_{1-20}$)carbonyloxy-1-methyl]butyl group,
[5-alkyl($C_{1-20}$)carbonyloxy-1-methyl]pentyl group,
[6-alkyl($C_{1-20}$)carbonyloxy-1-methyl]hexyl group.

(ii-3) 4-[2-alkoxyalkyloxy($C_{1-20}$)-1-methyl]ethylphenyl 4-[alkyl($C_{3-20}$)]benzoic acid ester, 4-[2-alkoxyalkyloxy($C_{1-20}$)-1-methyl]ethylphenyl 4-[alkyl($C_{3-20}$)oxy]benzoic acid ester, 4-[2-alkoxyalkyloxy($C_{1-20}$)-1-methyl]ethylphenyl 4-[alkyl($C_{3-20}$)oxycarbonyl]benzoic acid ester, 4-[2-alkoxyalkyloxy($C_{1-20}$)-1-methyl]ethylphenyl 4-[alkyl($C_{3-20}$)carbonyloxy]benzoic acid ester, 4-[2-alkoxyalkyloxy($C_{1-20}$)-1-methyl]ethylphenyl 4-[alkyl($C_{3-20}$)]-4'-biphenylcarboxylic acid ester, 4-[2-alkoxyalkyloxy($C_{1-20}$)-1-methyl]ethylphenyl 4-[alkyl($C_{3-20}$)oxy]-4'-biphenylcarboxylic acid ester, 4-[2-alkoxyalkyloxy($C_{1-20}$)-1-methyl]ethylphenyl 4-[alkyl($C_{3-20}$)oxycarbonyl]-4'-biphenylcarboxylic acid ester, 4-[2-alkoxyalkyloxy($C_{1-20}$)-1-methyl]ethylphenyl 4-[alkyl($C_{3-20}$)carbonyloxy]-4'-biphenylcarboxylic acid ester, 4-[2-alkoxyalkyloxy($C_{1-20}$)-1-methyl]ethyl-4'-biphenylyl 4-[alkyl($C_{3-20}$)]benzoic acid ester, 4-[2-alkoxyalkyloxy($C_{1-20}$)-1-methyl]ethyl-4'-biphenylyl 4-[alkyl($C_{3-20}$)oxy]benzoic acid ester, 4-[2-alkoxyalkyloxy($C_{1-20}$)-1-methyl]ethyl-4'-biphenylyl 4-[alkyl($C_{3-20}$)oxycarbonyl]benzoic acid ester, 4-[2-alkoxyalkyloxy($C_{1-20}$)-1-methyl]ethyl-4'-biphenylyl 4-[alkyl($C_{3-20}$)carbonyloxy]benzoic acid ester, 4-[2-alkoxyalkyloxy($C_{1-20}$)-1-methyl]ethyl-4'-biphenylyl 4-[alkyl($C_{3-20}$)]-4'-biphenylcarboxylic acid ester, 4-[2-alkoxyalkyloxy($C_{1-20}$)-1-methyl]ethyl-4'-biphenylyl 4-[alkyl($C_{3-20}$)oxy]-4'-biphenylcarboxylic acid ester, 4-[2-alkoxyalkyloxy($C_{1-20}$)-1-methyl]ethyl-4'-biphenylyl 4-[alkyl($C_{3-20}$)oxycarbonyl]-4-biphenylcarboxylic acid ester, 4-[2-alkoxyalkyloxy($C_{1-20}$)-1-methyl]ethyl-4-biphenylyl 4-[alkyl($C_{3-20}$)carbonyloxy]-4'-biphenylcarboxylic acid ester.

Further, mention may be made of the above enumerated compounds where the substituent [2-alkoxyalkyloxy-($C_{1-20}$)-1-methyl]ethyl is replaced with one of the following substituents:

[3-alkoxyalkyloxy($C_{1-20}$)-1-methyl]propyl group,
[4-alkoxyalkyloxy($C_{1-20}$)-1-methyl]butyl group,
[5-alkoxyalkyloxy($C_{1-20}$)-1-methyl]pentyl group,
[6-alkoxyalkyloxy($C_{1-20}$)-1-methyl]hexyl group.

(ii-4) 4-[2-Alkoxyalkylcarbonyloxy($C_{1-20}$)-1-methyl]ethylphenyl 4-[alkyl($C_{3-20}$)]benzoates, 4-[2-alkoxyalkylcarbonyloxy($C_{1-20}$)-1-methyl]ethylphenyl 4-[alkyl($C_{3-20}$)oxy]benzoate, 4-[2-alkoxyalkylcarbonyloxy($C_{1-20}$)-1-methyl]ethylphenyl 4-[alkyl($C_{3-20}$)oxycarbonyl]benzoates, 4-[2-alkoxyalkylcarbonyloxy($C_{1-20}$)-1-methyl]ethylphenyl 4-[alkyl($C_{3-20}$)carbonyloxy]benzoates, 4-[2-alkoxyalkylcarbonyloxy($C_{1-20}$)-1-methyl]ethylphenyl 4-[alkyl($C_{3-20}$)]-4'-biphenylcarboxylate, 4-[2-alkoxyalkylcarbonyloxy($C_{1-20}$)-1-methyl]ethylphenyl 4-[alkyl($C_{3-20}$)oxy]-4'-biphenylcarboxylate, 4-[2-alkoxyalkylcarbonyloxy($C_{1-20}$)-1-methyl]ethylphenyl 4-[alkyl($C_{3-20}$)oxycarbonyl]-4'-biphenylcarboxylates and 4-[2-alkoxyalkylcarbonyloxy($C_{1-20}$)-1-methyl]ethylphenyl 4-[alkyl($C_{3-20}$)carbonyloxy]-4'-biphenylcarboxylates.

4-[2-Alkoxyalkylcarbonyloxy($C_{1-20}$)-1-methyl]ethyl-4'-biphenylyl 4-[alkyl($C_{3-20}$)]benzoate, 4-[2-alkoxyalkylcarbonyloxy($C_{1-20}$)-1-methyl]ethyl-4'-biphenylyl 4-[alkyl($C_{3-20}$)oxy]benzoates, 4-[2-alkoxyalkylcarbonyloxy($C_{1-20}$)-1-methyl]ethyl-4'-biphenylyl 4-[alkyl($C_{3-20}$)oxycarbonyl]-benzoates, 4-[2-alkoxyalkylcarbonyloxy($C_{1-20}$)-1-methyl]ethyl-4'-biphenyl 4-[alkyl($C_{3-20}$)carbonyloxy]benzoate, 4-[2-alkoxyalkylcarbonyloxy($C_{1-20}$)-1-methyl]ethyl-4'-biphenylyl 4-[alkyl($C_{3-20}$)]-4'-biphenylcarboxylate, 4-[2-alkoxyalkylcarbonyloxy($C_{1-20}$)-1-methyl]ethyl-4'-biphenylyl 4-[alkyl($C_{3-20}$)oxy]-4'-biphenylcarboxylates, 4-[2-alkoxyalkylcarbonyloxy($C_{1-20}$)-1-methyl]ethyl-4'-biphenylyl 4-[alkyl($C_{3-20}$)oxycarbonyl]-4'-biphenylcarboxylates and 4-[2-alkoxyalkylcarbonyloxy($C_{1-20}$)-1-methyl]ethyl-4'-biphenylyl 4-[alkyl($C_{3-20}$)carbonyloxy]-4'-biphenylcarboxylates.

Further, mention may be made of the above enumerated compounds, where the substituent [2-alkoxyalkylcarbonyloxy($C_{1-20}$)-1-methyl]ethyl is replaced with one of the following substituents:

[3-alkoxyalkylcarbonyloxy($C_{1-20}$)-1-methyl]propyl group, [4-alkoxyalkylcarbonyloxy($C_{1-20}$)-1-methyl]butyl groups, [5-alkoxyalkylcarbonyloxy($C_{1-20}$)-1-methyl]pentyl groups and [6-alkoxyalkylcarbonyloxy($C_{1-20}$)-1-methyl]hexyl groups.

(ii-5) 4-[2-Alkyl($C_{1-20}$)oxypropyl]phenyl 4-[alkyl-($C_{3-20}$)]benzoates,

4-[2-alkyl($C_{1-20}$)oxypropyl]phenyl 4-[alkyl-($C_{3-20}$)oxy]benzoates,

4-[2-Alkyl($C_{1-20}$)oxypropyl]phenyl 4'-[alkyl-($C_{3-20}$)] 4-biphenylcarboxylates, 4-[2-alkyl($C_{1-20}$)oxypropyl]phenyl 4'-[alkyl($C_{3-20}$)oxy] 4-biphenylcarboxylates, 4-[2-alkyl($C_{1-20}$)oxypropyl]phenyl 4-[alkyl-($C_{3-20}$)oxycarbonyl]benzoates, 4-[2-alkyl($C_{1-20}$)oxypropyl]phenyl 4-[alkyl-($C_{3-20}$)carbonyloxy]benzoates, 4-[2-alkyl($C_{1-20}$)oxypropyl]phenyl 4'-[alkyl-($C_{3-20}$)oxycarbonyl] 4-biphenylcarboxylate, 4-[2-alkyl($C_{1-20}$)oxypropyl]phenyl 4'-[alkyl-($C_{3-20}$)carbonyloxy] 4-biphenylcarboxylates, 4-[2-alkyl($C_{1-20}$)carbonyloxypropyl]phenyl 4-[alkyl($C_{3-20}$)]benzoates, 4-[2-alkyl($C_{1-20}$)carbonyloxypropyl]phenyl 4-[alkyl($C_{3-20}$)oxy]benzoates, 4-[2-alkyl($C_{1-20}$)carbonyloxypropyl]phenyl 4'-[alkyl($C_{3-20}$)] 4-biphenylcarboxylates, 4-[2-alkyl($C_{1-20}$)carbonyloxypropyl]phenyl 4'-[alkyl($C_{3-20}$)oxy] 4-biphenylcarboxylates, 4-[2-Alkyl($C_{1-20}$)carbonyloxypropyl]phenyl 4-[alkyl($C_{3-20}$)carbonyloxy]benzoates, 4-[2-alkyl($C_{1-20}$)carbonyloxypropyl]phenyl 4-[alkyl($C_{3-20}$)oxycarbonyl]benzoates, 4-[2-alkyl($C_{1-20}$)carbonyloxypropyl]phenyl 4'-[alkyl($C_{3-20}$)carbonyloxy] 4-biphenylcarboxylates, 4-[2-alkyl($C_{1-20}$)carbonyloxypropyl]phenyl 4'-[alkyl($C_{3-20}$)oxycarbonyl]-4-biphenylcarboxylate, 4-[2-alkyl($C_{1-20}$)oxypropyl]-4'-biphenylyl 4-[alkyl($C_{3-20}$)]benzoates, 4-[2-alkyl($C_{1-20}$)oxypropyl]-4'-biphenylyl 4-[alkyl($C_{3-20}$)oxy]benzoates, 4-[2-alkyl($C_{1-20}$)oxypropyl]-4'-biphenylyl 4'-[alkyl($C_{3-20}$)] 4-biphenylcarboxylates, 4-[2-alkyl($C_{1-20}$)oxypropyl]-4'-biphenylyl 4'-[alkyl($C_{3-20}$)oxy] 4-biphenylcarboxylates, 4-[2-alkyl($C_{1-20}$)oxypropyl]-4'-biphenylyl 4-[alkyl($C_{3-20}$)oxycarbonyl]benzoates, 4-[2-alkyl($C_{1-20}$)oxypropyl]-4'-biphenylyl 4-[alkyl($C_{3-20}$)carbonyloxy]benzoates, 4-[2-alkyl($C_{1-20}$)oxypropyl]-4'-biphenylyl 4'-[alkyl($C_{3-20}$)oxycarbonyl] 4-biphenylcarboxylates, 4-[2-alkyl($C_{1-20}$)oxypropyl]-4'-biphenylyl 4'-[alkyl($C_{3-20}$)carbonyloxy] 4-biphenylcarboxylates, 4-[2-alkyl($C_{1-20}$)carbonyloxypropyl]-4'-biphenylyl 4-[alkyl($C_{3-20}$)]benzoates, 4-[2-alkyl($C_{1-20}$)carbonyloxypropyl]-4'-biphenylyl 4-[alkyl($C_{3-20}$)oxy]benzoates, 4-[2-alkyl($C_{1-20}$)carbonyloxypropyl]-4'-biphenylyl 4'-[alkyl($C_{3-20}$)] 4-biphenylcarboxylates, 4-[2-alkyl($C_{1-20}$)carbonyloxypropyl]-4'-biphenylyl 4'-[alkyl($C_{3-20}$)oxy] 4-biphenylcarboxylates, 4-[2-alkyl(C$_{1-20}$)carbonyloxypropyl]-4'-biphenylyl 4-[alkyl(C$_{3-20}$)carbonyloxy]benzoates, 4-[2-alkyl(C$_{1-20}$)carbonyloxypropyl]-4'-biphenylyl 4-[alkyl(C$_{3-20}$)oxycarbonyl]benzoates, 4-[2-alkyl(C$_{1-20}$)carbonyloxypropyl]-4'-biphenylyl 4'-[alkyl(C$_{3-20}$)carbonyloxy] 4-biphenylcarboxylates, 4-[2-alkyl(C$_{1-20}$)carbonyloxypropyl]-4'-biphenyl 4'-[alkyl(C$_{3-20}$)oxycarbonyl] 4-biphenylcarboxylates, 4-[2-alkoxyalkyl(C$_{1-20}$)oxypropyl]phenyl 4-[alkyl(C$_{3-20}$)]benzoates, 4-[2-alkoxyalkyl(C$_{1-20}$)oxypropyl]phenyl 4-[alkyl(C$_{3-20}$)oxy]benzoates, 4-[2-alkoxyalkyl(C$_{1-20}$)oxypropyl]phenyl 4'-[alkyl(C$_{3-20}$)] 4-biphenylcarboxylates, 4-[2-alkoxyalkyl(C$_{1-20}$)oxypropyl]phenyl 4'-[alkyl(C$_{3-20}$)oxy] 4-biphenylcarboxylates, 4-[2-alkoxyalkyl(C$_{1-20}$)oxypropyl]phenyl 4-[alkyl(C$_{3-20}$)carbonyloxy]benzoates, 4-[2-alkoxyalkyl(C$_{1-20}$)oxypropyl]phenyl 4-[alkyl(C$_{3-20}$)oxycarbonyl]benzoates, 4-[2-alkoxyalkyl(C$_{1-20}$)oxypropyl]phenyl 4'-[alkyl(C$_{3-20}$)carbonyloxy] 4-biphenylcarboxylates, 4-[2-alkoxyalkyl(C$_{1-20}$)oxypropyl]phenyl 4'-[alkyl(C$_{3-20}$)oxycarbonyl] 4-biphenylcarboxylates, 4-[2-alkoxyalkyl(C$_{1-20}$)carbonyloxypropyl]phenyl 4-[alkyl(C$_{3-20}$)]benzoates, 4-[2-alkoxyalkyl(C$_{1-20}$)carbonyloxypropyl]phenyl 4-[alkyl(C$_{3-20}$)oxy]benzoates, 4-[2-alkoxyalkyl(C$_{1-20}$)carbonyloxypropyl]phenyl 4'-[alkyl(C$_{3-20}$)]-4-biphenylcarboxylates, 4-[2-alkoxyalkyl(C$_{1-20}$)carbonyloxy]phenyl 4'-[alkyl(C$_{3-20}$)oxy]-4-biphenylcarboxylates, 4-[2-alkoxyalkyl(C$_{1-20}$)carbonyloxypropyl]phenyl 4-[alkyl(C$_{3-20}$)carbonyloxy]benzoates, 4-[2-alkoxyalkyl(C$_{1-20}$)carbonyloxypropyl]phenyl 4-[alkyl(C$_{3-20}$)oxycarbonyl]benzoates, 4-[2-alkoxyalkyl(C$_{1-20}$)carbonyloxypropyl]phenyl 4'-[alkyl(C$_{3-20}$)carbonyloxy]-4-biphenylcarboxylates, 4-[2-alkoxyalkyl(C$_{1-20}$)carbonyloxypropyl]phenyl 4'-[alkyl(C$_{3-20}$)oxycarbonyl]-4-biphenylcarboxylates.

4-[2-Alkoxyalkyl(C$_{1-20}$)oxypropyl]-4'-biphenylyl 4-[alkyl(C$_{3-20}$)]benzoates, 4-[2-alkoxyalkyl(C$_{1-20}$)oxypropyl]-4'-biphenylyl 4-[alkyl(C$_{3-20}$)oxy]benzoates, 4-[2-alkoxyalkyl(C$_{1-20}$)oxypropyl]-4'-biphenylyl 4'-[alkyl(C$_{3-20}$)] 4-biphenylcarboxylates, 4-[2-alkoxyalkyl(C$_{1-20}$)oxypropyl]-4'-biphenylyl 4'-[alkyl(C$_{3-20}$)oxy] 4-biphenylcarboxylates, 4-[2-alkoxyalkyl(C$_{1-20}$)oxypropyl]-4'-biphenylyl 4-[alkyl(C$_{3-20}$)carbonyloxy]benzoates, 4-[2-alkoxyalkyl(C$_{1-20}$)oxypropyl]-4'-biphenylyl 4-[alkyl(C$_{3-20}$)oxycarbonyl]benzoates, 4-[2-alkoxyalkyl(C$_{1-20}$)oxypropyl]-4'-biphenylyl 4'-[alkyl(C$_{3-20}$)carbonyloxy] 4-biphenylcarboxylates, 4-[2-alkoxyalkyl(C$_{1-20}$)oxypropyl]-4'-biphenylyl 4'-[alkyl(C$_{3-20}$)oxycarbonyl] 4-biphenylcarboxylates, 4-[2-alkoxyalkyl(C$_{1-20}$)carbonyloxypropyl]-4'-biphenylyl 4-[alkyl(C$_{3-20}$)]benzoates, 4-[2-alkoxyalkyl(C$_{1-20}$)carbonyloxypropyl]-4'-biphenylyl 4-[alkyl(C$_{3-20}$)oxy]benzoates, 4-[2-alkoxyalkyl(C$_{1-20}$)carbonyloxypropyl]-4'-biphenylyl 4'-[alkyl(C$_{3-20}$)]-4-biphenylcarboxylates, 4-[2-alkoxyalkyl(C$_{1-20}$)carbonyloxy]-4'-biphenylyl 4'-[alkyl(C$_{3-20}$)oxy]-4-biphenylcarboxylates, 4-[2-alkoxyalkyl(C$_{1-20}$)carbonylxoypropyl]-4'-biphenyl 4-[alkyl(C$_{3-20}$)carbonyloxy]benzoates, 4-[2-alkoxyalkyl(C$_{1-20}$)carbonyloxypropyl]-4'-biphenylyl 4-[alkyl(C$_{3-20}$)oxycarbonyl]benzoates, 4-[2-alkoxyalkyl(C$_{1-20}$)carbonyloxypropyl]-4'-biphenylyl 4'-[alkyl(C$_{3-20}$)carbonyloxy]-4-biphenylcarboxylates.

4-[2-alkoxyalkyl(C$_{1-20}$)carbonyloxypropyl]-4'-biphenylyl 4'-[alkyl(C$_{3-20}$)oxycarbonyl]-4-biphenylcarboxylates.

(ii-6) 4-[3-Alkyl(C$_{1-20}$)oxybutyl]phenyl 4-alkyl-(C$_{3-20}$)]benzoates,

4-[3-alkyl(C$_{1-20}$)oxybutyl]phenyl 4-[alkyl-(C$_{3-20}$)oxy]benzoates,

4-[3-alkyl(C$_{1-20}$)oxybutyl]phenyl 4'-[alkyl-(C$_{3-20}$)]-4-biphenylcarboxylates, 4-[3-alkyl(C$_{1-20}$)oxybutyl]phenyl 4'-[alkyl-(C$_{3-20}$)oxy]-4-biphenylcarboxylates, 4-[3-alkyl(C$_{1-20}$)oxybutyl]phenyl 4-[alkyl-(C$_{3-20}$)oxycarbonyl]benzoates, 4-[3-alkyl(C$_{1-20}$)oxybutyl]phenyl 4-[alkyl-(C$_{3-20}$)carbonyloxy]benzoates, 4-[3-alkyl(C$_{1-20}$)oxybutyl]phenyl 4'-[alkyl (C$_{3-20}$)oxycarbonyl]-4-biphenylcarboxylates, 4-[3-alkyl(C$_{1-20}$)oxybutyl]phenyl 4'-[alkyl-(C$_{3-20}$)carbonyloxy]-4-biphenylcarboxylates, 4-[3-alkyl(C$_{1-20}$)carbonyloxybutyl]phenyl 4-[alkyl(C$_{3-20}$)]benzoates, 4-[3-alkyl(C$_{1-20}$)carbonyloxybutyl]phenyl 4-[alkyl(C$_{3-20}$)oxy]benzoates, 4-[3-alkyl(C$_{1-20}$)carbonyloxybutyl]phenyl 4'-[alkyl(C$_{3-20}$)]-4-biphenylcarboxylates, 4-[3-alkyl(C$_{1-20}$)carbonyloxybutyl]phenyl 4'-[alkyl(C$_{3-20}$)oxy]-4-biphenylcarboxylates, 4-[3-alkyl(C$_{1-20}$)carbonyloxybutyl]phenyl [4-alkyl(C$_{3-20}$)carbonyloxy]benzoates, 4-[3-alkyl(C$_{1-20}$)carbonyloxybutyl]phenyl [4-alkyl(C$_{3-20}$)oxycarbonyl]benzoates, 4-[3-alkyl(C$_{1-20}$)carbonyloxybutyl]phenyl 4'-[alkyl(C$_{3-20}$)carbonyloxy]-4-biphenylcarboxylates, 4-[3-alkyl(C$_{1-20}$)carbonyloxybutyl]phenyl 4'-[alkyl(C$_{3-20}$)oxycarbonyl-4'-biphenylcarboxylates, 4-[3-alkyl(C$_{1-20}$)oxybutyl]-4'-biphenylyl 4-[alkyl(C$_{3-20}$)]benzoates, 4-[3-alkyl(C$_{1-20}$)oxybutyl]-4'-biphenylyl 4-[alkyl(C$_{3-20}$)oxy]benzoates, 4-[3-alkyl(C$_{1-20}$)oxybutyl]-4'-biphenylyl 4'-[alkyl(C$_{3-20}$)]-4-biphenylcarboxylates, 4-[3-alkyl(C$_{1-20}$)oxybutyl]-4'-biphenylyl 4'-[alkyl(C$_{3-20}$)oxy]-4-biphenylcarboxylates, 4-[3-alkyl(C$_{1-20}$)oxybutyl]-4'-biphenylyl 4-[alkyl(C$_{3-20}$)oxycarbonyl]benzoates, 4-[3-alkyl(C$_{1-20}$)oxybutyl]-4'-biphenylyl 4-[alkyl(C$_{3-20}$)carbonyloxy]benzoates, 4-[3-alkyl(C$_{1-20}$)oxybutyl]-4'-biphenylyl 4'-[alkyl(C$_{3-20}$)oxycarbonyl]-4-biphenylcarboxylates, 4-[3-alkyl(C$_{1-20}$)oxybutyl]-4'-biphenylyl 4'-[alkyl(C$_{3-20}$)carbonyloxy]-4-biphenylcarboxylates, 4-[3-alkyl(C$_{1-20}$)carbonyloxybutyl]-4'-biphenylyl 4-[alkyl(C$_{3-20}$)]benzoates, 4-[3-alkyl(C$_{1-20}$)carbonyloxybutyl]-4'-biphenylyl 4-[alkyl(C$_{3-20}$)oxy]benzoates, 4-[3-alkyl(C$_{1-20}$)carbonyloxybutyl]-4'-biphenylyl 4'-[alkyl(C$_{3-20}$)]-4-biphenylcarboxylates, 4-[3-alkyl(C$_{1-20}$)carbonyloxybutyl]-4'-biphenylyl 4'-[alkyl(C$_{3-20}$)oxy]-4-biphenylcarboxylates, 4-[3-alkyl(C$_{1-20}$)carbonyloxybutyl]-4'-biphenylyl [4-alkyl(C$_{3-20}$)carbonyloxy]benzoates, 4-[3-alkyl(C$_{1-20}$)carbonyloxybutyl]-4'-biphenylyl [4-alkyl(C$_{3-20}$)oxycarbonyl]benzoates, 4-[3-alkyl(C$_{1-20}$)carbonyloxybutyl]-4'-biphenylyl 4-[alkyl(C$_{3-20}$)carbonyloxy] 4-biphenylcarboxylates and 4-[3-alkyl($C_{1-20}$)carbonyloxybutyl]-4'-biphenylyl 4'-[alkyl($C_{3-20}$)oxycarbonyl]-4-biphenylcarboxylates.

4-[3-Alkoxyalkyl($C_{1-20}$)oxybutyl]phenyl 4-[alkyl($C_{3-20}$)]benzoates,

4-[3-alkoxyalkyl($C_{1-20}$)oxybutyl]phenyl 4-[alkyl($C_{3-20}$)oxy]benzoates,

4-[3-alkoxyalkyl($C_{1-20}$)oxybutyl]phenyl 4'-[alkyl($C_{3-20}$)]-4-biphenylcarboxylates, 4-[3-alkoxyalkyl($C_{1-20}$)oxybutyl]phenyl 4'-[alkyl($C_{3-20}$)oxy]-4-biphenylcarboxylates, 4-[3-alkoxyalkyl($C_{1-20}$)oxybutyl]phenyl 4-[alkyl($C_{3-20}$)carbonyloxy]benzoates, 4-[3-alkoxyalkyl($C_{1-20}$)oxybutyl]phenyl 4-[alkyl($C_{3-20}$)oxycarbonyl]benzoates, 4-[3-alkoxyalkyl($C_{1-20}$)oxybutyl]phenyl 4'-[alkyl($C_{3-20}$)carbonyloxy]-4-biphenylcarboxylate, 4-[3-alkoxyalkyl($C_{1-20}$)oxybutyl]phenyl 4'-[alkyl($C_{3-20}$)oxycarbonyl]-4-biphenylcarboxylates, 4-[3-alkoxyalkyl($C_{1-20}$)carbonyloxybutyl]phenyl 4-[alkyl($C_{3-20}$)]benzoates, 4-[3-alkoxyalkyl($C_{1-20}$)carbonyloxybutyl]phenyl 4-[alkyl($C_{3-20}$)oxy]benzoates, 4-[3-alkoxyalkyl($C_{1-20}$)carbonyloxybutyl]phenyl 4'-[alkyl($C_{3-20}$)]-4-biphenylcarboxylates, 4-[3-alkoxyalkyl($C_{1-20}$)carbonyloxybutyl]phenyl 4'-[alkyl($C_{3-20}$)oxy]-4-biphenylcarboxylates, 4-[3-alkoxyalkyl($C_{1-20}$)carbonyloxybutyl]phenyl 4-[alkyl($C_{3-20}$)carbonyloxy]benzoates, 4-[3-alkoxyalkyl($C_{1-20}$)carbonyloxybutyl]phenyl 4-[alkyl($C_{3-20}$)oxycarbonyl]benzoates, 4-[3-alkoxyalkyl($C_{1-20}$)carbonyloxybutyl]phenyl 4'-[alkyl($C_{3-20}$)carbonyloxy]-4-biphenylcarboxylates, 4-[3-alkoxyalkyl($C_{1-20}$)carbonyloxybutyl]phenyl 4'-[alkyl($C_{3-20}$)oxycarbonyl]-4-biphenylcarboxylates, 4-[3-alkoxyalkyl($C_{1-20}$)oxybutyl]-4'-biphenylyl 4-[alkyl($C_{3-20}$)]benzoates, 4-[3-alkoxyalkyl($C_{1-20}$)oxybutyl]-4'-biphenylyl 4-[alkyl($C_{3-20}$)oxy]benzoates, 4-[3-alkoxyalkyl($C_{1-20}$)oxybutyl]-4'-biphenylyl 4'-[alkyl($C_{3-20}$)]-4-biphenylcarboxylates, 4-[3-alkoxyalkyl($C_{1-20}$)oxybutyl]-4'-biphenylyl 4'-[alkyl($C_{3-20}$)oxy]-4-biphenylcarboxylates, 4-[3-alkoxyalkyl($C_{1-20}$)oxybutyl]-4'-biphenylyl 4-[alkyl($C_{3-20}$)carbonyloxy]benzoates, 4-[3-alkoxyalkyl($C_{1-20}$)oxybutyl]'4-'biphenylyl 4-[alkyl($C_{3-20}$)oxycarbonyl]benzoates, 4-[3-alkoxyalkyl($C_{1-20}$)oxybutyl]-4'-biphenylyl 4'-[alkyl($C_{3-20}$)carbonyloxy]-4-biphenylcarboxylates, 4-[3-alkoxyalkyl($C_{1-20}$)oxybutyl]-4'-biphenylyl 4'-[alkyl($C_{3-20}$)oxycarbonyl]-4-biphenylcarboxylates, 4-[3-alkoxyalkyl($C_{1-20}$)carbonyloxybutyl]-4'-biphenylyl 4-[alkyl($C_{3-20}$)]benzoates, 4-[3-alkoxyalkyl($C_{1-20}$)carbonyloxybutyl]-4'-biphenylyl 4-[alkyl($C_{3-20}$)oxy]benzoates, 4-[3-alkoxyalkyl($C_{1-20}$)carbonyloxybutyl]-4'-biphenylyl 4'-[alkyl($C_{3-20}$)]-4-biphenylcarboxylates, 4-[3-alkoxyalkyl($C_{1-20}$)carbonyloxybutyl]-4'-biphenylyl 4'-[alkyl($C_{3-20}$)oxy]-4-biphenylcarboxylates, 4-[3-alkoxyalkyl($C_{1-20}$)carbonyloxybutyl]-4'-biphenylyl 4-[alkyl($C_{3-20}$)carbonyloxy]benzoates, 4-[3-alkoxyalkyl($C_{1-20}$)carbonyloxybutyl]-4'-biphenylyl 4-[alkyl($C_{3-20}$)oxycarbonyl]benzoates, 4-[3-alkoxyalkyl($C_{1-20}$)carbonyloxybutyl]-4'-biphenylyl 4'-[alkyl($C_{3-20}$)carbonyloxy]-4-biphenylcarboxylates and 4-[3-alkoxyalkyl($C_{1-20}$)carbonyloxybutyl]-4'-biphenylyl 4'-[alkyl($C_{3-20}$)oxycarbonyl]-4-biphenylcarboxylates.

(ii-7) 4-[4-alkyl($C_{1-20}$)oxypentyl]phenyl 4-[alkyl-($C_{3-20}$)]benzoates,

4-[4-alkyl($C_{1-20}$)oxypentyl]phenyl 4-[alkyl-($C_{3-20}$)oxy]benzoates,

4-[4-alkyl($C_{1-20}$)oxypentyl]phenyl 4'-[alkyl-($C_{3-20}$)]-4-biphenylcarboxylates, 4-[4-alkyl($C_{1-20}$)oxypentyl]phenyl 4'-[alkyl-($C_{3-20}$)oxy]-4-biphenylcarboxylates, 4-[4-alkyl($C_{1-20}$)oxypentyl]phenyl 4-[alkyl-($C_{3-20}$)oxycarbonyl]benzoates, 4-[4-alkyl($C_{1-20}$)oxypentyl]phenyl 4-[alkyl-($C_{3-20}$)carbonyloxy]benzoates, 4-[4-alkyl($C_{1-20}$)oxypentyl]phenyl 4'-[alkyl-($C_{3-20}$)oxycarbonyl]-4-biphenylcarboxylates, 4-[4-alkyl($C_{1-20}$)oxypentyl]phenyl 4'-[alkyl-($C_{3-20}$)carbonyloxy]-4-biphenylcarboxylates, 4-[4-alkyl($C_{1-20}$)carbonyloxypentyl]phenyl 4-[alkyl($C_{3-20}$)]benzoates, 4-[4-alkyl($C_{1-20}$)carbonyloxypentyl]phenyl 4-[alkyl($C_{3-20}$)oxy]benzoates, 4-[4-alkyl($C_{1-20}$)carbonyloxypentyl]phenyl 4'-[alkyl($C_{3-20}$)]-4-biphenylcarboxylates, 4-[4-alkyl($C_{1-20}$)carbonyloxypentyl]phenyl 4'-[alkyl($C_{3-20}$)oxy]-4-biphenylcarboxylates, 4-[4-alkyl($C_{1-20}$)carbonyloxypentyl]phenyl 4-[alkyl($C_{3-20}$)carbonyloxy]benzoates, 4-[4-alkyl($C_{1-20}$)carbonyloxypentyl]phenyl [4-alkyl($C_{3-20}$)oxycarbonyl]benzoates, 4-[4-alkyl($C_{1-20}$)carbonyloxypentyl]phenyl 4'-[alkyl($C_{3-20}$)carbonyloxy]-4-biphenylcarboxylates and 4-[4-alkyl($C_{1-20}$)carbonyloxypentyl]phenyl 4'-[alkyl($C_{3-20}$)oxycarbonyl]-4-biphenylcarboxylate, 4-[4-alkyl($C_{1-20}$)oxypentyl]-4'-biphenylyl 4-[alkyl($C_{3-20}$)]benzoates, 4-[4-alkyl($C_{1-20}$)oxypentyl]-4'-biphenylyl 4-[alkyl($C_{3-20}$)oxy]benzoates, 4-[4-alkyl($C_{1-20}$)oxypentyl]-4'-biphenylyl 4'-[alkyl($C_{3-20}$)]-4-biphenylcarboxylates, 4-[4-alkyl($C_{1-20}$)oxypentyl]-4'-biphenylyl 4'-[alkyl($C_{3-20}$)oxy]-4-biphenylcarboxylates, 4-[4-alkyl($C_{1-20}$)oxypentyl]-4'-biphenylyl 4-[alkyl($C_{3-20}$)oxycarbonyl]benzoates, 4-[4-alkyl($C_{1-20}$)oxypentyl]-4'-biphenylyl 4-[alkyl($C_{3-20}$)carbonyloxy]benzoates, 4-[4-alkyl($C_{1-20}$)oxypentyl]-4'-biphenylyl 4'-[alkyl($C_{3-20}$)oxycarbonyl]-4-biphenylcarboxylates, 4-[4-alkyl($C_{1-20}$)oxypentyl]-4'-biphenylyl 4'-[alkyl($C_{3-20}$)carbonyloxy]-4-biphenylcarboxylates, 4-[4-alkyl($C_{1-20}$)carbonyloxypentyl]-4'-biphenylyl 4-[alkyl($C_{3-20}$)]benzoates, 4-[4-alkyl($C_{1-20}$)carbonyloxypentyl]-4'-biphenylyl 4-[alkyl($C_{3-20}$)oxy]benzoates, 4-[4-alkyl($C_{1-20}$)carbonyloxypentyl]-4'-biphenylyl 4'-[alkyl($C_{3-20}$)]-4-biphenylcarboxylates, 4-[4-alkyl($C_{1-20}$)carbonyloxypentyl]-4'-biphenylyl 4'-[alkyl($C_{3-20}$)oxy]-4-biphenylcarboxylates, 4-[4-alkyl($C_{1-20}$)carbonyloxypentyl]-4'-biphenylyl 4-[alkyl($C_{3-20}$)carbonyloxy]benzoates, 4-[4-alkyl($C_{1-20}$)carbonyloxypentyl]-4'-biphenylyl [4-alkyl($C_{3-20}$)oxycarbonyl]benzoates, 4-[4-alkyl($C_{1-20}$)carbonyloxypentyl]-4'-biphenylyl 4'-[alkyl($C_{3-20}$)carbonyloxy]-4-biphenylcarboxylate, and 4-[4-alkyl($C_{1-20}$)carbonyloxypentyl]-4'-biphenylyl 4'-[alkyl($C_{3-20}$)oxycarbonyl]-4-biphenylcarboxylates, 4-[4-alkoxyalkyl($C_{1-20}$)oxypentyl]phenyl 4-[alkyl($C_{3-20}$)]benzoates, 4-[4-alkoxyalkyl($C_{1-20}$)oxypentyl]phenyl 4-[alkyl($C_{3-20}$)oxy]benzoates, 4-[4-alkoxyalkyl($C_{1-20}$)oxypentyl]phenyl 4'-[alkyl($C_{3-20}$)]-4-biphenylcarboxylates, 4-[4-alkoxyalkyl($C_{1-20}$)oxypentyl]phenyl 4'-[alkyl($C_{3-20}$)oxy]-4-biphenylcarboxylates, 4-[4-alkoxyalkyl($C_{1-20}$)oxypentyl]phenyl 4-[alkyl($C_{3-20}$)carbonyloxy]benzoates, 4-[4-alkoxyalkyl($C_{1-20}$)oxypentyl]phenyl 4-[alkyl($C_{3-20}$)oxycarbonyl]benzoates, 4-[4-alkoxyalkyl($C_{1-20}$)oxypentyl]phenyl 4'-[alkyl($C_{3-20}$)carbonyloxy]-4-biphenylcarboxylates, 4-[4-alkoxyalkyl($C_{1-20}$)oxypentyl]phenyl 4'-[alkyl($C_{3-20}$)oxycarbonyl]-4-biphenylcarboxylates, 4-[4-alkoxyalkyl($C_{1-20}$)carbonyloxypentyl]phenyl 4-[alkyl($C_{3-20}$)]benzoates, 4-[4-alkoxyalkyl($C_{1-20}$)carbonyloxypentyl]phenyl 4-[alkyl($C_{3-20}$)oxy]benzoates, 4-[4 -alkoxyalkyl($C_{1-20}$)carbonyloxypentyl]phenyl 4'-[alkyl($C_{3-20}$)]-4-biphenylcarboxylates, 4 -[4 -alkoxyalkyl($C_{1-20}$)carbonyloxypentyl]phenyl 4'-[alkyl($C_{3-20}$)oxy]-4-biphenylcarboxylates, 4-[4-alkoxyalkyl($C_{1-20}$)carbonyloxypentyl]phenyl 4-alkyl($C_{3-20}$)carbonyloxy]benzoates, 4-[4-alkoxyalkyl($C_{1-20}$)carbonyloxypentyl]phenyl 4-[alkyl($C_{3-20}$)oxycarbonyl]benzoates, 4-[4-alkoxyalkyl($C_{1-20}$)carbonyloxypentyl]phenyl 4'-[alkyl($C_{3-20}$)carbonyloxy]-4-biphenylcarboxylates, 4-[4-alkoxyalkyl($C_{1-20}$)carbonyloxypentyl]phenyl 4'-[alkyl($C_{3-20}$)oxycarbonyl]-4-biphenylcarboxylates, 4-[4-alkoxyalkyl($C_{1-20}$)oxypentyl]-4'-biphenylyl 4-[alkyl($C_{3-20}$)]benzoates, 4-[4-akkoxyalkyl($C_{1-20}$)oxypentyl]-4'-biphenylyl 4-[alkyl($C_{3-20}$)oxy]benzoates, 4-[4-alkoxyalkyl($C_{1-20}$)oxypentyl]-4'-biphenylyl 4'-[alkyl($C_{3-20}$)]-4-biphenylcarboxylates, 4-[4-alkoxyalkyl($C_{1-20}$)oxypentyl]-4'-biphenylyl 4'-[alkyl($C_{3-20}$)oxy]-4-biphenylcarboxylates, 4-[4-alkoxyalkyl($C_{1-20}$)oxypentyl]-4'-biphenylyl 4-[alkyl($C_{3-20}$)carbonyloxy]benzoates, 4-[4-alkoxyalkyl($C_{1-20}$)oxypentyl]-4'-biphenylyl 4-[alkyl($C_{3-20}$)oxycarbonyl]benzoates, 4-[4-alkoxyalkyl($C_{1-20}$)oxypentyl]-4'-biphenylyl 4'-[alkyl($C_{3-20}$)carbonyloxy]-4-biphenylcarboxylates, 4-[4-alkoxyalkyl($C_{1-20}$)oxypentyl]-4'-biphenylyl 4'-[alkyl($C_{3-20}$)oxycarbonyl]-4-biphenylcarboxylates, 4-[4-alkoxyalkyl($C_{1-20}$)carbonyloxypentyl]-4'-biphenylyl 4-[alkyl($C_{3-20}$)]benzoates, 4-[4-alkoxyalkyl($C_{1-20}$)carbonyloxypentyl]-4'-biphenylyl 4-[alkyl($C_{3-20}$)oxy]benzoates, 4-[4-alkoxyalkyl($C_{1-20}$)carbonyloxypentyl]-4'-biphenylyl 4'-[alkyl($C_{3-20}$)]-4-biphenylcarboxylates, 4-[4-alkoxyalkyl($C_{1-20}$)carbonyloxypentyl]-4'-biphenylyl 4'-[alkyl($C_{3-20}$)oxy]-4-biphenylcarboxylates, 4-[4-alkoxyalkyl($C_{1-20}$)carbonyloxypentyl]-4'-biphenylyl 4-[alkyl($C_{3-20}$)carbonyloxy]benzoates, 4-[4-alkoxyalkyl($C_{1-20}$)carbonyloxypentyl]-4'-biphenylyl 4-[alkyl($C_{3-20}$)oxycarbonyl]benzoates, 4-[4-alkoxyalkyl($C_{1-20}$)carbonylxoypentyl]-4'-biphenylyl 4'-[alkyl($C_{3-20}$)carbonyloxy]-4-biphenylcarboxylates, 4-[4-alkoxyalkyl($C_{1-20}$)carbonyloxypentyl]-4'-biphenylyl 4'-[alkyl($C_{3-20}$)oxycarbonyl]-4-biphenylcarboxylates.

In addition to the above exemplified compounds, there can be exemplified those compounds, where the 4-[2-alkyl($C_{1-20}$)oxypentyl], 4-[4-alkyl($C_{1-20}$)carbonyloxypentyl], 4-[4-alkoxyalkyl($C_{1-20}$)oxypentyl] and 4-[4-alkoxyalkyl($C_{1-20}$)carbonyloxypentyl] in the above examples is replaced with 4-[5-alkyl($C_{1-20}$)oxyhexyl], 4-[5-alkyl($C_{1-20}$)carbonyloxyhexyl], 4-[5-alkoxyalkyl-($C_{1-20}$)oxyheptyl] or 4-[5-alkoxyalkyl($C_{1-20}$)carbonyloxyheptyl], respectively, or with 4-[6-alkyl($C_{1-20}$)-oxyheptyl], 4-[6-alkyl($C_{1-20}$)carbonyloxyheptyl], 4-[6-alkoxyalkyl($C_{1-20}$)oxyheptyl] or 4-[6-alkoxyalkyl-($C_{1-20}$)carbonyloxyheptyl], respectively.

The optically active aromatic compounds (I) in accordance with the present invention are useful as a liquid crystal.

The liquid crystal of the present invention can be prepared in a manner known per se using the aromatic compounds (I) with or without any known compound and adjustant usable for the liquid crystal. The mixing ratio and other conditions can be determined depending on the purpose of use.

Among the present aromatic compounds (I), those having the alkoxyalkyl as $R_2$ are preferred because of exhibiting the liquid crystal phase at a relatively low temperature and lowering a liquid phase transition temperature and those having alkyl of 8 to 16 carbon atoms as $R_1$ are preferred because of exhibiting the desired liquid crystal phase.

In the preparation of liquid crystal, the optically active aromatic compound or compounds to be used can be selected from those represented by the above formula (I) depending on the characteristic features thereof to be desired. For example, those exhibiting a ferroelectric liquid crystal phase can be used in each alone or in a mixture thereof to obtain the desired liquid crystal, and the others can be used for the preparation of liquid crystal exhibiting a ferroelectricity as a whole. Further, those having 1 as s have better effects on enhancement of spontaneous polarization values, and those having 1 as l and k have a low viscosity of exhibit high-speed responsiveness.

The present liquid crystal can be utilized for producing a light switching element in a manner known per se.

The optically active aromatic compound (I) of the present invention can be characterized by providing a liquid crystal having sufficient spontaneous polarization, high speed responsiveness and low viscosity and exhibiting a liquid crystal phase at a relatively low temperature.

The present invention is illustrated in more detail with reference to the following Examples, which are only illustrative, but not limitative.

EXAMPLE 1

Into a four-necked flask equipped with a thermometer and a stirrer were charged 1.11 g (5 mmols) of (+)-4-(1-methyl-2-propoxyethyl)benzoic acid, 1.33 g (6 mmols) of 4-octyloxyphenol and 30 ml of anhydrous dichloromethane. Thereto were added 1.22 g (6 mmols) of N,N-dicyclohexylcarbodiimide and 0.1 g of 4-pyrrolidinopyridine and the mixture was stirred at room temperature for a whole day and night.

After completion of a reaction, the resulting precipitate was collected by filtration and diluted with 200 ml of toluene. The organic layer was washed with water, 5% aqueous acetic acid, water, 5% aqueous sodium hydrogencarbonate, and water in succession, then dried over anhydrous magnesium sulfate and thereafter concentrated under reduced pressure. The residue was purified by silica gel column chromatography (eluent: toluene-ethyl acetate) to obtain 1.90 g (yield 89%) of (+)-4-octyloxyphenyl 4-(1-methyl-2-propoxyethyl)-benzoate.

EXAMPLES 2-14

Reaction and after-treatment were carried out in the same manner as in Example 1 except that starting materials shown in Table 1 were used. The results are shown in Table 1.

TABLE 1

$$Z = -\overset{CH_3}{\underset{*}{CH}}(CH_2)_p-$$

| | Starting materials | | | | | | | | | | | | | | Optically active aromatic compound (I) | | | | | | | | | | Yield (%) | $[\alpha]_D^{20}$ (C = 1, CHCl$_3$) | Phase transition temperature (°C.) |
|---|---|---|---|---|---|---|---|---|---|---|---|---|---|---|---|---|---|---|---|---|---|---|---|---|---|---|---|
| | Phenol (II) | | | | Carboxylic acid (III) | | | | | | | | | | | | | | | | | | | | | | |
| Example | R$_1$ | Y | l | m | k | p | s | R$_2$ | R$_1$ | m | Y | l | X | k | s | p | R$_2$ | | | | | | | | | | |
| 1 | n-C$_8$H$_{17}$ | —O— | 1 | 1 | 1 | 1 | 0 | n-C$_3$H$_7$ | n-C$_8$H$_{17}$ | 1 | —O— | 1 | —OCO— | 1 | 0 | 1 | n-C$_3$H$_7$ | | | | | | | | 89 | +2.8° | K <u>29</u>⇄I |
| 2 | " | " | " | " | " | " | " | n-C$_5$H$_{11}$ | " | " | " | " | " | " | " | " | n-C$_5$H$_{11}$ | | | | | | | | 86 | −3° | K <u>23</u>⇄I |
| 3 | " | —COO— | " | " | " | " | " | n-C$_3$H$_7$ | " | " | —COO— | " | " | " | " | " | n-C$_3$H$_7$ | | | | | | | | 84 | +3° | K——I |
| 4 | " | —OCO— | " | " | " | " | " | " | " | " | —OCO— | " | " | " | " | " | " | | | | | | | | 80 | +2.7° | K——I |
| 5 | " | —O— | 2 | " | " | " | " | n-C$_5$H$_{11}$ | " | 2 | —O— | " | " | " | " | " | n-C$_5$H$_{11}$ | | | | | | | | 88 | +2° | K <u>72</u> Sc* <u>90</u> Ch <u>105</u> I |
| 6 | n-C$_{10}$H$_{21}$ | — | " | 0 | " | " | " | " | n-C$_{10}$H$_{21}$ | 0 | — | " | " | " | " | " | " | | | | | | | | 88 | +3° | K——I |
| 7 | n-C$_{10}$H$_{21}$ | —O— | 1 | 1 | 1 | 2 | 0 | n-C$_5$H$_{11}$ | n-C$_{10}$H$_{21}$ | 1 | —O— | 1 | —OCO— | 1 | 0 | 2 | n-C$_5$H$_{11}$ | | | | | | | | 83 | +6.5° | K <u>3</u>⇄I |
| 8 | n-C$_{16}$H$_{33}$ | " | " | 1 | 1 | 2 | 1 | CH$_3$ | n-C$_{16}$H$_{33}$ | " | " | " | " | 1 | 1 | 2 | CH$_3$ | | | | | | | | 84 | −0.5° | K——I |
| 9 | n-C$_{10}$H$_{21}$ | " | " | " | 2 | 2 | 0 | n-C$_3$H$_7$ | n-C$_{10}$H$_{21}$ | " | " | " | " | 2 | 0 | 2 | n-C$_3$H$_7$ | | | | | | | | 88 | +3.8° | K——I |
| 10 | n-C$_{12}$H$_{25}$ | " | " | " | 1 | 1 | 1 | n-C$_{12}$H$_{25}$ | n-C$_{12}$H$_{25}$ | " | " | " | " | 1 | 1 | 1 | n-C$_{12}$H$_{25}$ | | | | | | | | 83 | −1.0° | K——I |
| 11 | n-C$_{10}$H$_{21}$ | " | " | " | 1 | 2 | 0 | —(CH$_2$)$_3$OC$_2$H$_5$ | n-C$_{10}$H$_{21}$ | " | " | " | " | 1 | 0 | 2 | —(CH$_2$)$_3$OC$_2$H$_5$ | | | | | | | | 85 | +6.8° | K——I |
| 12 | n-C$_{12}$H$_{25}$ | " | " | " | 1 | 1 | 0 | F<br>CH$_2$CHC$_5$H$_{11}$<br>*(S) | n-C$_{12}$H$_{25}$ | " | " | " | " | 1 | 0 | 1 | F<br>CH$_2$CHC$_5$H$_{11}$<br>(S) | | | | | | | | 91 | +3.0° | K——I |
| 13 | n-C$_{12}$H$_{25}$ | " | 2 | " | 1 | 3 | 0 | CH$_3$ | n-C$_{12}$H$_{25}$ | " | " | 2 | " | 1 | 0 | 3 | CH$_3$ | | | | | | | | 89 | +3.0° | K——I |
| 14 | n-C$_{12}$H$_{25}$ | " | 2 | " | 1 | 4 | 0 | CH$_3$ | n-C$_{12}$H$_{25}$ | " | " | 2 | " | 1 | 0 | 4 | CH$_3$ | | | | | | | | 91 | +4.1° | |

EXAMPLE 15

Into a four-necked flask equipped with a thermometer and a stirrer were charged 1.11 g (5 mmols) of (—)-4-(1-methyl-2-pentyloxyethyl)phenol and 20 ml of pyridine. Thereto was added 1.78 g (6 mmols) of 4-decyloxybenzoic acid chloride at 20°–25° C., followed by stirring for 1 hour at that temperature and then for 4 hours at 40° C.

After completion of reaction, the reaction mixture was poured into 4N hydrochloric acid and extracted with 200 ml of toluene. The organic layer was washed with water, 5% aqueous sodium hydrogencarbonate and water in succession, then dried over anhydrous magnesium sulfate and thereafter concentrated under reduced pressure. The residue was purified by silica gel column chromatography (eluent: toluene-ethyl acetate) to obtain 2.32 g (yield 96%) of (—)-4-decyloxybenzoic acid 4-(1-methyl-2-pentyloxyethyl)phenyl ester. $[\alpha]_D^{20°} -3°$ (c=1, CHCl$_3$) phase transition temperature $$K \xrightarrow{25} I.$$
$$\diagdown_{23}$$
$$S_A$$

EXAMPLES 16–26

Reaction and after-treatment were carried out in the same manner as in Example 15 except that starting materials shown in Table 2 were used. The results obtained are shown in Table 2.

TABLE 2

$$Z = -\overset{CH_3}{\underset{*}{CH}}(CH_2)_p-$$

| | Starting materials | | | | | | | | | | | | | | | | | | |
|---|---|---|---|---|---|---|---|---|---|---|---|---|---|---|---|---|---|---|---|
| | Carboxylic acid chloride (IV) | | | | Optically active phenol (V) | | | | | Optically active aromatic compound (I) | | | | | | | | | Phase transition temperature (°C) |
| Example | $R_1$ | Y | l | m | k | p | s | $R_2$ | $R_1$ | m | Y | l | X | k | s | p | $R_2$ | Yield (%) | $[\alpha]_D^{20}$ (C = 1, $CHCl_3$) | |
| 16 | n-$C_{18}H_{37}$ | —O— | 1 | 1 | 1 | 1 | 0 | n-$C_5H_{11}$ | n-$C_{18}H_{37}$ | 1 | —O— | 1 | —COO— | 1 | 0 | 1 | n-$C_5H_{11}$ | 98 | −2.5° | K $\underline{\ 37\ }$ $S_I$ $\underline{\ 56\ }$ $S_C^*$ $\underline{\ 104\ }$ SA $\underline{\ 131\ }$ I |
| 17 | n-$C_{10}H_{21}$ | " | 2 | " | " | " | " | n-$C_5H_{11}$ | n-$C_{10}H_{21}$ | " | " | 2 | " | " | " | " | n-$C_5H_{11}$ | 96 | −2.7° | K —— I |
| 18 | n-$C_{10}H_{21}$ | " | 1 | " | " | " | 1 | n-$C_5H_{11}$ | " | " | " | " | " | " | 1 | " | n-$C_5H_{11}$ | 98 | −3° | K —— I |
| 19 | " | " | 1 | " | " | " | 1 | n-$C_{12}H_{25}$ | " | " | " | " | " | " | " | " | n-$C_{12}H_{25}$ | 98 | −3° | K —— I |

| | Starting materials | | | | | | | | | | | | | | | | | | |
|---|---|---|---|---|---|---|---|---|---|---|---|---|---|---|---|---|---|---|---|
| | Carboxylic acid chloride (IV) | | | | Optically active phenol (V) | | | | | Optically active aromatic compound (I) | | | | | | | | | Phase transition temperature (°C) |
| Example | $R_1$ | Y | l | m | k | p | s | $R_2$ | $R_1$ | m | Y | l | X | k | s | p | $R_2$ | Yield (%) | $[\alpha]_D^{20}$ (C = 1, $CHCl_3$) | |
| 20 | n-$C_{10}H_{21}$ | —O— | 1 | 1 | 1 | 1 | 0 | —$(CH_2)_3OC_2H_5$ | n-$C_{10}H_{21}$ | 1 | —O— | 1 | —COO— | 1 | 0 | 1 | $(CH_2)_3OC_2H_5$ | 70 | −4.0° | K —— I |
| 21 | n-$C_{10}H_{21}$ | " | 1 | " | " | 2 | " | —$CH_2\overset{F}{\underset{(S)}{CH}}C_4H_9$ | n-$C_{10}H_{21}$ | 1 | " | 1 | " | " | " | 2 | $CH_2\overset{F}{\underset{(S)}{CH}}C_4H_9$ | 96 | −7.2° | " |
| 22 | " | " | 1 | " | " | " | " | n-$C_5H_{11}$ | " | " | " | " | " | " | " | " | n-$C_5H_{11}$ | 92 | −7.0° |  K $\underline{\ 11\ }$ $S_C^*$ $\underline{\ -14\ }$ I, −22 |

| | Starting materials | | | | | | | | | | | | | | | | | | |
|---|---|---|---|---|---|---|---|---|---|---|---|---|---|---|---|---|---|---|---|
| | Carboxylic acid chloride (IV) | | | | Optically active phenol (V) | | | | | Optically active aromatic compound (I) | | | | | | | | | Phase transition temperature (°C) |
| Example | $R_1$ | Y | l | m | k | p | s | $R_2$ | $R_1$ | m | Y | l | X | k | s | p | $R_2$ | Yield (%) | $[\alpha]_D^{20}$ (C = 1, $CHCl_3$) | |
| 23 | n-$C_{10}H_{21}$ | —O— | 1 | 1 | 2 | 2 | 0 | n-$C_5H_{11}$ | n-$C_{10}H_{21}$ | 1 | —O— | 1 | —COO— | 2 | 0 | 2 | n-$C_5H_{11}$ | 89 | −4.0° | K —— I |
| 24 | n-$C_{12}H_{25}$ | — | " | 0 | 1 | 3 | " | $CH_3$ | n-$C_{12}H_{25}$ | 0 | — | " | " | 1 | " | 3 | $CH_3$ | 88 | −5.0° | " |
| 25 | " | " | " | " | " | 4 | 1 | " | " | 1 | —O— | 2 | " | 1 | 1 | 4 | " | 90 | +1.8° | |
| 26 | " | —O— | 2 | 1 | " | 4 | " | " | " | " | " | " | " | " | " | " | " | 92 | +1.5° | |

EXAMPLES 27-30

The liquid crystal compositions shown in Table 3 were prepared using the liquid crystal compounds. The preparation procedure was that a given compound weighed in a given amount was mixed in a sample bottle, while being heated and molten.

Compound exhibiting $S^*_C$ phase by itself is also shown in Table 3, in addition to the above Examples.

[Process for the preparation of liquid crystal element]

On a glass substrate provided with an indium oxid transparent electrode, a polyimide polymeric membrane is further provided. This is rubbed using a gauze in a certain direction and then a liquid crystal cell is assembled by using glass fibers (a diameter of 5 μm) as a spacer, so as to allow two substrates to be parallel in the rubbing direction. The above liquid crystal composition(s) or compound(s) is sealed in vacuo into the liquid crystal cell to obtain a liquid crystal element.

To the thus-obtained liquid crystal element combined with a polarizer, 20 V of electric voltage were applied, and then change in transmitted light strength was observed. At that time, spontaneous polarization values (determined by Sawyer-Tower method) is shown in Table 3.

As clear from the results, when the liquid crystal materials of the present invention is used, ferroelectric liquid crystals driven at room temperature can be made when such liquid crystal materials are formed into liquid crystal compositions, even if such materials per se do not exhibit any liquid crystal phase. This ferroelectric liquid crystals have been found to posses spontaneous polarization values ($P_s$) necessary to a high speed response and further to be able to become compound(s) (compositions) having $S^*_C$ phase at a low temperature region.

decyloxybenzoic acid and 30 ml of anhydrous dichloromethane. Thereto were added 1.22 g (6 mmols) of N,N'-dicyclohexylcarbodiimide and 0.1 g of 4-pyrrolidinopyridine and the mixture was stirred at room temperature for a whole day and night.

After completion of reaction, the resulting precipitates was collected by filtration and diluted with 200 ml of toluene. The organic layer was washed with water, 5% aqueous acetic acid, water, 5% aqueous sodium hydrogencarbonate, and water in succession, then dried over anhydrous magnesium sulfate and thereafter concentrated under reduced pressure. The residue was purified by silica gel column chromatography (eluent: toluene-ethyl acetate) to obtain 1.95 g (yield 86%) of (−)-4-decyloxybenzoic acid 4-(2-propoxypropyl)phenyl ester.

EXAMPLE 32

Into a four-necked flask equipped with a thermometer and a stirrer were charged 1.11 g (5 mmols) of (+)-4-(2-butyryloxypropyl)phenol and 20 ml of pyridine. Thereto was added 1.78 g (6 mmols) of 4-decyloxybenzoic acid chloride at 20°-25° C., followed by stirring for 1 hour at that temperature and then for 4 hours at 40° C.

After completion of reaction, the reaction mixture was poured into 4N hydrochloric acid and extracted with 200 ml of toluene. The organic layer was washed with water, 5% aqueous sodium hydrogencarbonate and water in succession, then dried over anhydrous magnesium sulfate and thereafter concentrated under reduced pressure. The residue was purified by silica gel column chromatography (eluent: toluene-ethyl acetate) to obtain 2.29 g (yield 95%) of (+)-4-decyloxybenzoic acid 4-(2-butyryloxypropyl)phenyl ester.

EXAMPLES 33-49

TABLE 3

| Example | Composition component (wt %) or Compd. No. | Phase transition temperature (°C.) | $P_S$ (nc/cm²) |
|---|---|---|---|
| 27 | 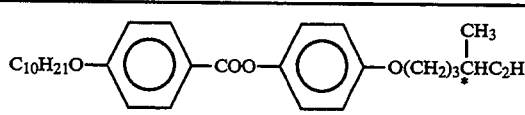 C₁₀H₂₁O—⟨O⟩—COO—⟨O⟩—O(CH₂)₃ĊHC₂H₅ with CH₃ (known compd.) (80%) / Compd. of Example 38 (20%) | K —11— $S^*_C$ —48— $S_A$ —50— N —53— I | 7 |
| 28 | 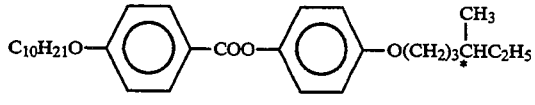 C₁₀H₂₁O—⟨O⟩—COO—⟨O⟩—O(CH₂)₃ĊHC₂H₅ with CH₃ Compd. of Example 32 (80%) (20%) | K —8— $S^*_C$ —41— $S_A$ —49— N —51— I | 12 |
| 29 | Compd. of Example 5 | | 10 |
| 30 | Compd. of Example 17 | | 20 |

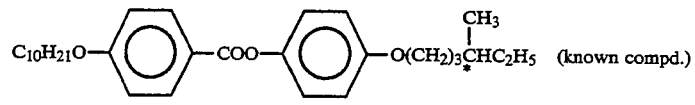

C₁₀H₂₁O—⟨O⟩—COO—⟨O⟩—O(CH₂)₃ĊHC₂H₅  (known compd.)
               CH₃

K —35— $S^*_C$ —70— $S_A$ —74— I     $P_S \approx 0$

EXAMPLE 31

Into a four-necked flask equipped with a thermometer and a stirrer were charged 0.97 g (5 mmols) of (−)-4-(2-propoxypropyl)phenol, 1.67 g (6 mmols) of 4-

Reaction and after-treatment were carried out in the same manner as in Example 31 except that starting carboxylic acids and starting phenols as shown in Table 4 were used. The results obtained are shown in Table 4.

TABLE 4

$$Z = \text{\textparenleft}CH_2\text{\textparenright}_p\overset{CH_3}{\underset{*}{-CH-}}$$
(p = 1);
m = 1,
k = 1

| Example | Starting material compound (II) or (IV) | | | Optically active material compound (V) or (III) | | | Optically active aromatic compound (I) | | | | | Yield (%) | $[\alpha]_D^{20}$, (c = 1, CHCl$_3$) | Phase transition temperature (°C.) |
|---|---|---|---|---|---|---|---|---|---|---|---|---|---|---|
| | R$_1$ | Y | l | s | R$_2$ | | R$_1$ | Y | X | s | R$_2$ | | | |
| 31 | n-C$_{10}$H$_{21}$ | —O— | 1 | 0 | n-C$_3$H$_7$ | | n-C$_{10}$H$_{21}$ | —O— | 1 | —COO— | 0 | n-C$_3$H$_7$ | 86 | −6° | K $\xrightarrow{31}$ I |
| 32 | n-C$_{10}$H$_{21}$ | —O— | 1 | 1 | n-C$_3$H$_7$ | | n-C$_{10}$H$_{21}$ | —O— | 1 | —COO— | 1 | n-C$_3$H$_7$ | 95 | +0.8° | K $\xrightarrow{30}$ I |
| 33 | n-C$_{10}$H$_{21}$ | —O— | 1 | 0 | n-C$_5$H$_{11}$ | | n-C$_{10}$H$_{21}$ | —O— | 1 | —COO— | 0 | n-C$_5$H$_{11}$ | 88 | −5.3° | K $\xrightarrow{20}$ I, S$_A$ 5 |
| 34 | n-C$_8$H$_{17}$ | —COO— | 1 | 0 | n-C$_3$H$_7$ | | n-C$_8$H$_{17}$ | —COO— | 1 | —COO— | 0 | n-C$_3$H$_7$ | 87 | −5.8° | K — I |
| 35 | n-C$_8$H$_{17}$ | —O— | 1 | 0 | —(CH$_2$)$_3$OC$_2$H$_5$ | | n-C$_8$H$_{17}$ | —O— | 1 | —COO— | 0 | —(CH$_2$)$_3$OC$_2$H$_5$ | 85 | −5.3° | " |
| 36 | n-C$_8$H$_{17}$ | —O— | 1 | 0 | $\underset{*}{-CH_2\overset{CH_3}{\underset{|}{CH}}C_2H_5}$ (S) | | n-C$_8$H$_{17}$ | —O— | 1 | —COO— | 0 | $\underset{*}{-CH_2\overset{CH_3}{\underset{|}{CH}}C_2H_5}$ (S) | 88 | −6.0° | " |
| 37 | n-C$_8$H$_{17}$ | —O— | 1 | 0 | $\underset{*}{-CH_2\overset{F}{\underset{|}{CH}}C_5H_{11}}$ (S) | | n-C$_8$H$_{17}$ | —O— | 1 | —COO— | 0 | $\underset{*}{-CH_2\overset{F}{\underset{|}{CH}}C_5H_{11}}$ (S) | 86 | −6.2° | " |

| Example | Starting material compound (II) or (IV) | | | Optically active phenyl propanol derivative (I) | | | | | | | | Yield (%) | $[\alpha]_D^{20}$, (c = 1, CHCl$_3$) | Phase transition temperature (°C.) |
|---|---|---|---|---|---|---|---|---|---|---|---|---|---|---|
| | R$_1$ | Y | l | s | R$_2$ | | R$_1$ | Y | X | s | R$_2$ | | | |
| 38 | n-C$_{10}$H$_{21}$ | —O— | 1 | 0 | n-C$_5$H$_{11}$ | | n-C$_{10}$H$_{21}$ | —O— | 1 | —OCO— | 0 | n-C$_5$H$_{11}$ | 89 | −5.3° | K $\xrightarrow{5}$ I |
| 39 | n-C$_9$H$_{19}$ | —()— | 2 | 0 | n-C$_5$H$_{11}$ | | n-C$_9$H$_{19}$ | —()— | 2 | —COO— | 0 | n-C$_5$H$_{11}$ | 85 | −5° | |
| 40 | n-C$_{10}$H$_{21}$ | —O— | 2 | 0 | n-C$_5$H$_{11}$ | | n-C$_{10}$H$_{21}$ | —O— | 2 | —COO— | 0 | n-C$_5$H$_{11}$ | 84 | −5° | K $\xrightarrow{53}$ S$_c$* $\xrightarrow{90}$ S$_A$ $\xrightarrow{125}$ I |
| 41 | n-C$_{10}$H$_{21}$ | —O— | 2 | 0 | n-C$_5$H$_{11}$ | | n-C$_{10}$H$_{21}$ | —O— | 2 | —OCO— | 0 | n-C$_5$H$_{11}$ | 81 | −5.2° | K $\xrightarrow{53}$ S$_c$* $\xrightarrow{89}$ Ch $\xrightarrow{110}$ I |
| 42 | n-C$_{10}$H$_{21}$ | —O— | 1 | 0 | n-C$_8$H$_{17}$ | | n-C$_{10}$H$_{21}$ | —O— | 1 | —COO— | 0 | n-C$_8$H$_{17}$ | 85 | −4.8° | K — I |

TABLE 4-continued $$Z = -(CH_2)_p - \underset{*}{CH} - \underset{|}{\phantom{C}}$$
$$CH_3$$
$$(p = 1); m = 1, k = 1$$

| Ex-ample | Starting material compound (IV) or (II) | | | | | | Optically active material compd. (V) or (III) | | | | Optically active aromatic compound (I) | | | | | | | | Yield (%) | $[\alpha]_D^{20}$ (c = 1, CHCl$_3$) | Phase transition temperature (°C) |
|---|---|---|---|---|---|---|---|---|---|---|---|---|---|---|---|---|---|---|---|---|---|
| | R$_1$ | Y | m | l | k | s | R$_2$ | R$_1$ | Y | R$_2$ | R$_1$ | Y | m | l | k | X | s | R$_2$ | | | |
| 43 | n-C$_{16}$H$_{33}$ | —O— | 1 | 1 | 1 | 0 | n-C$_5$H$_{11}$ | n-C$_{16}$H$_{33}$ | —O— | n-C$_5$H$_{11}$ | n-C$_{16}$H$_{33}$ | —O— | 1 | 1 | 1 | —COO— | 0 | n-C$_5$H$_{11}$ | 84 | −4.2° | |
| 44 | n-C$_8$H$_{17}$ | —OCO— | 1 | 1 | 1 | 1 | n-C$_5$H$_{11}$ | n-C$_8$H$_{17}$ | —OCO— | n-C$_5$H$_{11}$ | | | 1 | 1 | 1 | —OCO— | 1 | n-C$_5$H$_{11}$ | 91 | +1.1° | K —— I |
| 45 | n-C$_{10}$H$_{21}$ | —O— | 1 | 1 | 1 | 0 | n-C$_{12}$H$_{25}$ | n-C$_{10}$H$_{21}$ | —O— | n-C$_{12}$H$_{25}$ | | | 1 | 1 | 1 | —COO— | 0 | n-C$_{12}$H$_{25}$ | 73 | −4.2° | K —— I |
| 46 | n-C$_8$H$_{17}$ | —O— | 1 | 2 | 2 | 0 | n-C$_3$H$_7$ | n-C$_8$H$_{17}$ | —O— | n-C$_3$H$_7$ | | | 1 | 1 | 2 | —COO— | 0 | n-C$_3$H$_7$ | 88 | −4.5° | K $\xrightarrow{66}$ S$_1$ $\xrightarrow{71}$ S$_c$* $\xrightarrow{107}$ Ch $\xrightarrow{126}$ I |
| 47 | n-C$_8$H$_{17}$ | —O— | 1 | 1 | 2 | 0 | n-C$_3$H$_7$ | n-C$_8$H$_{17}$ | —O— | n-C$_3$H$_7$ | | | 1 | 1 | 2 | —OCO— | 0 | n-C$_3$H$_7$ | 82 | −4.6° | |
| 48 | n-C$_{12}$H$_{25}$ | —O— | 1 | 1 | 2 | 0 | (CH$_2$)$_3$OC$_2$H$_5$ | n-C$_{12}$H$_{25}$ | —O— | (CH$_2$)$_3$OC$_2$H$_5$ | | | 1 | 1 | 2 | —COO— | 0 | (CH$_2$)$_3$OC$_2$H$_5$ | 87 | −5.1° | |
| 49 | n-C$_{12}$H$_{25}$ | —() | 0 | 1 | 2 | 1 | n-C$_5$H$_{11}$ | n-C$_{12}$H$_{25}$ | —() | n-C$_5$H$_{11}$ | | | 0 | 1 | 2 | —COO— | 1 | n-C$_5$H$_{11}$ | 88 | +2.0° | |

**m = 0

EXAMPLES 50-53

The liquid crystal compositions shown in Table 5 were prepared using the liquid crystal compounds the preparation procedure was that a given compound weighed in a given amount was mixed in a sample bottle, while being heated and molten.

Compound exhibiting $S^*_c$ phase by itself is also shown in Table 5, in addition to the above Examples.

[Process for the preparation of liquid crystal element]

On a glass substrate provided with an indium oxid transparent electrode, a polyimide polymeric membrane is further provided. This is rubbed using a gauze in a certain direction and then a liquid crystal cell is assembled by using glass fibers (a diameter of 5 μm) as a spacer, so as to allow two substrates to be parallel in the rubbing direction. The above liquid crystal composition(s) or compound(s) is sealed in vacuo into the liquid crystal cell to obtain a liquid crystal element.

To the thus-obtained liquid crystal element combined with a polarizer, 20 V of electric voltage were applied, and then change in transmitted light strength was observed. At that time, spontaneous polarization values (determined by Sawyer-Tower method) is shown in Table 5.

As clear from the results, when the liquid crystal materials of the present invention is used, ferroelectric liquid crystals driven at room temperature can be made when such liquid crystal materials are formed into liquid crystal compositions, even if such materials per se do not exhibit any liquid crystal phase. This ferroelectric liquid crystals have been found to posses spontaneous polarization values ($P_S$) necessary to a high speed response and further to be able to become compound(s) (compositions) having $S^*_c$ phase at a low temperature region.

decyloxybenzoic acid and 30 ml of anhydrous dichloromethane. Thereto were added 1.22 g (6 mmols) of N,N'-dicyclohexylcarbodiimide and 0.1 g of 4-pyrrolidinopyridine and the mixture was stirred at room temperature for a whole day and night.

After completion of reaction, the resulting precipitate was collected by filtration and diluted with 200 ml of toluene. The organic layer was washed with water, 5% aqueous acetic acid, water, 5% aqueous sodium hydrogencarbonate, and water in succession, then dried over anhydrous magnesium sulfate and thereafter concentrated under reduced pressure. The residue was purified by silica gel column chromatography (eluent: toluene-ethyl acetate) to obtain 2.08 g (yield 89%) of (−) -4-decyloxybenzoic acid 4-(3-propoxybutyl)phenyl ester.

EXAMPLE 55

Into a four-necked flask equipped with a thermometer and a stirrer were charged 1.18 g (5 mmols) of (+)-4-(3-butyryloxybutyl)phenol and 20 ml of pyridine. Thereto was added 1.78 g (6 mmols) of 4-decyloxybenzoic acid chloride at 20°–25° C., followed by stirring for 1 hour at that temperature and then for 4 hours at 40° C.

After completion of reaction, the reaction mixture was poured into 4N hydrochloric acid and extracted with 200 ml of toluene. The organic layer was washed with water, 5% aqueous sodium hydrogencarbonate and water in succession, then dried over anhydrous magnesium sulfate and thereafter concentrated under reduced pressure. The residue was purified by silica gel column chromatography (eluent: toluene-ethyl acetate) to obtain 2.38 g (yield 96%) of (+)-4-decyloxybenzoic acid 4-(3-butyryloxybutyl)phenyl ester.

EXAMPLES 56-88

Reaction and after-treatment were carried out in the same manner as in Example 54 except that starting car-

TABLE 5

| Example | Composition component (wt %) or Compd. No. | Phase transition temperature (°C.) | $P_S$ (nc/cm²) |
|---|---|---|---|
| 50 | 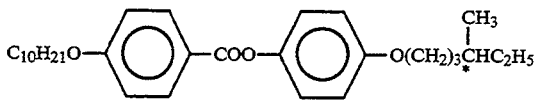 (known compd.) (80%) / Compd. of Example 38 (20%) | K $\xrightarrow{8}$ $S^*_c$ $\xrightarrow{47}$ $S_A$ $\xrightarrow{51}$ N $\xrightarrow{58}$ I | 8 |
| 51 | 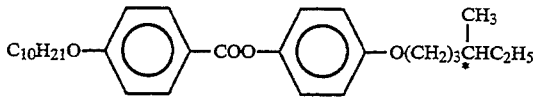 (80%) / Compd. of Example 32 (20%) | K $\xrightarrow{5}$ $S^*_c$ $\xrightarrow{42}$ $S_A$ $\xrightarrow{47}$ N $\xrightarrow{51}$ I | 16 |
| 52 | Compd. of Example 41 | | 30 |
| 53 | Compd. of Example 46 | | 20 |
| (Cf) | 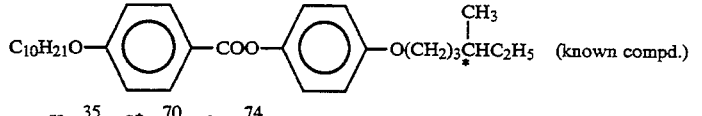 (known compd.) K $\xrightarrow{35}$ $S^*_c$ $\xrightarrow{70}$ $S_A$ $\xrightarrow{74}$ I | $P_S \approx 0$ | |

EXAMPLE 54

Into a four-necked flask equipped with a thermometer and a stirrer were charged 1.04 g (5 mmols) of (−)-4-(3-propoxybutyl)phenol, 1.67 g (6 mmols) of 4- boxylic acids and starting phenols as shown in Table 6 were used. The results obtained are shown in Table 6. (For reference, yields and properties of the compounds obtained in Examples 54–55 are also shown in Table 6.)

TABLE 6

$$Z = -(CH_2)_2-\overset{CH_3}{\underset{*}{CH}}-$$

| Example | Carboxylic acid (IV) R₁ | Y | m | l | k | s | Optically active phenol (V) R₂ | R₁ | Y | Optically active aromatic compound (I) m | l | k | X | s | R₂ | Yield (%) | $[\alpha]_D^{20}$ (c = 1, CHCl₃) | Phase transition temperature (°C.) |
|---|---|---|---|---|---|---|---|---|---|---|---|---|---|---|---|---|---|---|
| 54 | n-C₁₀H₂₁ | —O— | 1 | 1 | 1 | 0 | n-C₃H₇ | n-C₁₀H₂₁ | —O— | 1 | 1 | 1 | —COO— | 0 | n-C₃H₇ | 89 | −6° | K $\underset{-11.5}{\overset{15.5}{\rightleftarrows}}$ S$_C^*$ $\underset{9}{\overset{}{\rightleftarrows}}$ S$_A$ $\overset{15}{\rightarrow}$ I |
| 55 | n-C₁₀H₂₁ | —O— | 1 | 1 | 1 | 1 | n-C₃H₇ | n-C₁₀H₂₁ | —O— | 1 | 1 | 1 | —COO— | 1 | n-C₃H₇ | 96 | +2° | K $\underset{4.9}{\overset{33}{\rightleftarrows}}$ S$_A$ $\overset{5.8}{\rightarrow}$ I |
| 56 | n-C₇H₁₅ | —O— | 1 | 1 | 1 | 0 | n-C₃H₇ | n-C₇H₁₅ | —O— | 1 | 1 | 1 | —COO— | 0 | n-C₃H₇ | 90 | −6.1° | K $\underset{-7.5}{\overset{36}{\rightleftarrows}}$ S$_A$ $\overset{3.3}{\rightarrow}$ I |
| 57 | n-C₁₀H₂₁ | —O— | 1 | 1 | 1 | 0 | n-C₅H₁₁ | n-C₁₀H₂₁ | —O— | 1 | 1 | 1 | —COO— | 0 | n-C₅H₁₁ | 85 | −6° | K $\overset{}{\underset{0}{\rightarrow}}$ S$_C^*$ $\overset{8}{\rightarrow}$ I |
| 58 | n-C₇H₁₅ | —O— | 1 | 1 | 1 | 0 | n-C₁₆H₃₃ | n-C₇H₁₅ | —O— | 1 | 1 | 1 | —COO— | 0 | n-C₁₆H₃₃ | 88 | −4° | |
| 59 | n-C₁₆H₃₃ | —O— | 1 | 1 | 1 | 0 | n-C₅H₁₁ | n-C₁₆H₃₃ | —O— | 1 | 1 | 1 | —COO— | 0 | n-C₅H₁₁ | 85 | −5.2° | |
| 60 | n-C₁₀H₂₁ | — | 1 | 0 | 1 | 0 | n-C₃H₇ | n-C₁₀H₂₁ | — | 0 | 1 | 1 | —COO— | 0 | n-C₃H₇ | 84 | −5° | K $\overset{14.5}{\rightarrow}$ I |
| 61 | n-C₈H₁₇ | —COO— | 1 | 1 | 1 | 0 | n-C₅H₁₁ | n-C₈H₁₇ | —COO— | 1 | 1 | 1 | —COO— | 0 | n-C₅H₁₁ | 88 | −5.8° | K $\overset{}{\underset{-4}{\rightarrow}}$ S$_A$ $\overset{-2}{\rightarrow}$ I |
| 62 | n-C₈H₁₇ | —COO— | 1 | 1 | 1 | 1 | n-C₅H₁₁ | n-C₈H₁₇ | —COO— | 1 | 1 | 1 | —COO— | 1 | n-C₅H₁₁ | 94 | +1.9° | K $\underset{-26}{\overset{}{\rightarrow}}$ S$_C^*$ $\overset{-3}{\rightarrow}$ S$_A$ $\overset{}{\underset{4}{\rightarrow}}$ I |
| 63 | n-C₁₀H₂₁ | —O— | 1 | 1 | 1 | 0 | —(CH₂)₃O—C₂H₅ | n-C₁₀H₂₁ | —O— | 1 | 1 | 1 | —COO— | 0 | —(CH₂)₃OC₂H₅ | 90 | −6° | |
| 64 | n-C₁₀H₂₁ | —O— | 1 | 1 | 1 | 0 | $\underset{*}{-CH_2\overset{Cl}{CH}CH_3}$ (S) | n-C₁₀H₂₁ | —O— | 1 | 1 | 1 | —COO— | 0 | $\underset{*}{-CH_2\overset{Cl}{CH}CH_3}$ (S) | 89 | −6.4° | |
| 65 | n-C₁₀H₂₁ | —O— | 1 | 1 | 1 | 0 | n-C₈H₁₇ | n-C₁₀H₂₁ | —O— | 1 | 1 | 1 | —COO— | 0 | n-C₈H₁₇ | 88 | −5.3° | K $\underset{-16}{\overset{}{\rightarrow}}$ S$_C^*$ $\overset{10}{\rightarrow}$ I |
| 66 | n-C₁₀H₂₁ | —O— | 2 | 1 | 1 | 0 | n-C₃H₇ | n-C₁₀H₂₁ | —O— | 1 | 2 | 1 | —COO— | 0 | n-C₃H₇ | 86 | −5° | K $\underset{40}{\overset{}{\rightarrow}}$ S$_C^*$ $\overset{132}{\rightarrow}$ S$_A$ $\overset{141.5}{\rightarrow}$ I |
| 67 | n-C₉H₁₉ | —()— | 2 | 0 | 1 | 0 | n-C₃H₇ | n-C₉H₁₉ | —()— | 0 | 2 | 1 | —COO— | 0 | n-C₃H₇ | 85 | −5.1° | K $\underset{44}{\overset{}{\rightarrow}}$ S$_1$ $\overset{65.5}{\rightarrow}$ S$_C^*$ $\overset{86}{\rightarrow}$ S$_A$ $\overset{113}{\rightarrow}$ I |
| 68 | n-C₁₀H₂₁ | —O— | 2 | 1 | 1 | 1 | n-C₃H₇ | n-C₁₀H₂₁ | —O— | 1 | 2 | 1 | —COO— | 1 | n-C₃H₇ | 81 | +1.9° | |

TABLE 6-continued $Z = -(CH_2)_2-\overset{*}{C}H(CH_3)-$

| | Carboxylic acid (IV) | | | | | Optically active phenol (V) | | Optically active aromatic compound (I) | | | | | | Yield | $[\alpha]_D^{20}$ | Phase transition |
|---|---|---|---|---|---|---|---|---|---|---|---|---|---|---|---|---|
| Example | R₁ | Y | l | m | k | s | R₂ | m | l | k | X | s | R₂ | (%) | (c=1, CHCl₃) | temperature (°C) |
| 69 | n-C₈H₁₇ | —O— | 1 | 1 | 2 | 0 | n-C₃H₇ | 1 | 1 | 2 | —COO— | 0 | n-C₃H₇ | 84 | −5° | K $\xrightarrow{30}$ S₁ $\xrightarrow{72}$ Sc* $\xrightarrow{110}$ Ch $\xrightarrow{129}$ I |
| 70 | n-C₁₀H₂₁ | —O— | 1 | 1 | 1 | 1 | n-C₅H₁₁ | 1 | 1 | 1 | —COO— | 1 | n-C₅H₁₁ | 82 | +2.1° | |
| 71 | n-C₁₂H₂₅ | —O— | 1 | 1 | 1 | 0 | n-C₂H₅ | 1 | 1 | 1 | —COO— | 0 | n-C₂H₅ | 86 | −5° | K $\xrightarrow{26}$ Sc* $\xrightarrow{30}$ S_A $\xrightarrow{31}$ I |
| 72 | n-C₁₀H₂₁ | —O— | 1 | 1 | 1 | 0 | —CH₂*CHC₅H₁₁ (S), F | 1 | 1 | 1 | —COO— | 0 | CH₂*CHC₅H₁₁ (S), F | 89 | −6.3° | |
| 73 | n-C₁₀H₂₁ | —O— | 1 | 1 | 1 | 1 | CH₃ | 1 | 1 | 1 | —COO— | 1 | CH₃ | 82 | +3.1° | K $\xleftarrow{}$ Sc* $\xleftarrow{11}$ S_A $\xleftarrow{20}$ I |
| 74 | n-C₁₀H₂₁ | —O— | 1 | 1 | 1 | 1 | n-C₅H₁₁ | 1 | 1 | 1 | —COO— | 1 | n-C₅H₁₁ | 81 | +1.9° | K $\xleftarrow{-2}$ S_A $\xleftarrow{5}$ I |
| 75 | n-C₁₀H₂₁ | —O— | 1 | 1 | 1 | 1 | n-C₈H₁₇ | 1 | 1 | 1 | —COO— | 1 | n-C₈H₁₇ | 84 | +2.0° | K $\xrightarrow{6.9}$ S_A $\xrightarrow{25}$ I |
| 76 | n-C₁₀H₂₁ | —O— | 1 | 1 | 1 | 0 | n-C₅H₁₁ | 1 | 1 | 1 | —COO— | 0 | n-C₅H₁₁ | 84 | −5.1° | K $\xrightarrow{28}$ I |
| 77 | n-C₁₆H₃₃ | —O— | 1 | 1 | 1 | 0 | n-C₅H₁₁ | 1 | 1 | 1 | —OCO— | 0 | n-C₅H₁₁ | 84 | −4.9° | K —— I |
| 78 | n-C₁₀H₂₁ | —O— | 1 | 1 | 1 | 1 | n-C₃H₇ | 1 | 1 | 1 | —OCO— | 1 | n-C₃H₇ | 88 | +1.5° | K —— I |
| 79 | n-C₁₀H₂₁ | —O— | 1 | 1 | 1 | 0 | —CH₂*CHC₅H₁₁ (S), F | 1 | 1 | 1 | —OCO— | 0 | CH₂*CHC₅H₁₁ (S), F | 81 | −5.5° | K —— I |
| 80 | n-C₈H₁₇ | —O— | 1 | 1 | 2 | 0 | n-C₃H₇ | 1 | 2 | 1 | —OCO— | 0 | n-C₃H₇ | 84 | −3.8° | K $\xrightarrow{35}$ S₁ $\xrightarrow{48}$ Sc* $\xrightarrow{73}$ S_A $\xrightarrow{77}$ Ch $\xrightarrow{114}$ I |
| 81 | n-C₁₀H₂₁ | —O— | 2 | 1 | 1 | 0 | n-C₅H₁₁ | 2 | 1 | 1 | —OCO— | 0 | n-C₅H₁₁ | 86 | −5.0° | K $\xrightarrow{82}$ Sc* $\xrightarrow{111}$ I |
| 82 | n-C₉H₁₉ | — | 1 | 0 | 1 | 0 | n-C₅H₁₁ | 0 | 1 | 1 | —OCO— | 0 | n-C₅H₁₁ | 85 | −5.1° | K —— I |
| 83 | n-C₁₀H₂₁ | —O— | 1 | 1 | 0 | 0 | n-C₈H₁₇ | 1 | 1 | 0 | —OCO— | 0 | n-C₈H₁₇ | 84 | −4.3° | K —— I |
| 84 | n-C₈H₁₇ | —O— | 1 | 1 | 2 | 1 | n-C₅H₁₁ | 1 | 1 | 2 | —OCO— | 1 | n-C₅H₁₁ | 81 | +1.8° | K —— I |
| 85 | n-C₁₀H₂₁ | —O— | 1 | 1 | 1 | 0 | —(CH₂)₆OC₂H₅ | 1 | 1 | 1 | —OCO— | 0 | —(CH₂)₆OC₂H₅ | 81 | −4.0 | K —— I |
| 86 | n-C₈H₁₇ | —COO— | 1 | 1 | 1 | 0 | n-C₅H₁₁ | 1 | 1 | 1 | —OCO— | 0 | n-C₅H₁₁ | 85 | −4.1 | K —— I |

TABLE 6-continued $$Z = -(CH_2)_2-\overset{CH_3}{\underset{*}{CH}}-$$

| Example | Carboxylic acid (IV) | | | | | Optically active phenol (V) | | | | Optically active aromatic compound (I) | | | | | | | Yield (%) | $[\alpha]_D^{20}$, (c = 1, CHCl$_3$) | Phase transition temperature (°C.) |
|---|---|---|---|---|---|---|---|---|---|---|---|---|---|---|---|---|---|---|---|
| | R$_1$ | Y | l | m | k | s | R$_2$ | | | m | l | k | X | s | R$_2$ | | | | |
| 87 | n-C$_8$H$_{17}$ | —OCO— | 1 | 1 | 1 | 0 | n-C$_5$H$_{11}$ | | | 1 | 1 | 1 | —OCO— | 0 | n-C$_5$H$_{11}$ | 84 | −3.9 | K —— I |
| 88 | n-C$_{10}$H$_{21}$ | —O— | 1 | 1 | 1 | 0 | —CH$_2$CHOC$_3$H$_7$<br>$\vert$<br>CH$_3$<br>(S) | | | 1 | 1 | 1 | —OCO— | 0 | —CH$_2$CHOC$_3$H$_7$<br>$\vert$<br>CH$_3$<br>(S) | 84 | −4.2 | K —— I |

EXAMPLES 89-92

The liquid crystal compositions shown in Table 7 were prepared using the liquid crystal compounds. The preparation procedure was that a given compound weighed in a given amount was mixed in a sample bottle, while being heated and molten.

[Process for the preparation of liquid crystal element]

On a glass substrate provided with an indium oxid transparent electrode, a polyimide polymeric membrane is further provided. This is rubbed using a gauze in a certain direction and then a liquid crystal cell is assembled by using glass fibers (a diameter of 5 μm) as a spacer, so as to allow two substrates to be parallel in the rubbing direction. The above liquid crystal composition(s) or compound(s) is sealed in vacuo into the liquid crystal cell to obtain a liquid crystal element.

To the thus-obtained liquid crystal element combined with a polarizer, 20 V of electric voltage were applied, and then change in transmitted light strength was observed. At that time, spontaneous polarization values (determined by Sawyer-Tower method) is shown in Table 7.

As clear from the results, when the liquid crystal materials of the present invention is used, ferroelectric liquid crystals driven at room temperature can be made when such liquid crystal materials are formed into liquid crystal compositions, even if such materials per se do not exhibit any liquid crystal phase. This ferroelectric liquid crystals have been found to posses spontaneous polarization values ($P_s$) necessary to a high speed response and further to be able to become compound(s) (compositions) having $S^*_c$ phase at a low temperature region.

EXAMPLES 93-97

The liquid materials shown in Table 8 are sealed in the liquid crystal elements prepared in Example 89 and are measured respectively in the spontaneous polarization. The results are given in Table 8.

TABLE 7

| Example | Composition component (wt %) or Compd. No. | | Phase transition temperature (°C.) | $P_S$ (nc/cm²) |
|---|---|---|---|---|
| 89 | 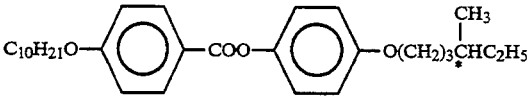 (known compound) Compd. of Example 76 | (80%) (20%) | $K \xrightarrow{6} S_1 \xrightarrow{13} S_c^* \xrightarrow{53} N^* \xrightarrow{57} I$ | 9 |
| 90 | Example 54 Example 66 | (50%) (50%) | $K - S_1 \xrightarrow{19} S_c^* \xrightarrow{78} S_A \xrightarrow{83} I$ | 20 |
| 91 | 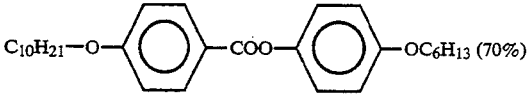 Compd. of Example 76 | (70%) (30%) | $K \xrightarrow{10} S_c^* \xrightarrow{55} N^* \xrightarrow{61} I$ | 11 |
| 92 | 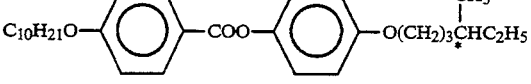 Compd. of Example 55 | (80%) (20%) | $K \xrightarrow{12} S_c^* \xrightarrow{55} N^* \xrightarrow{60} I$ | 29 |
| (Cf) | 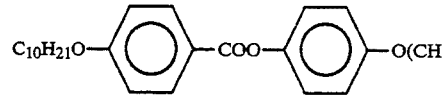 (known compound) $K \xrightarrow{35} S_c^* \xrightarrow{70} S_A \xrightarrow{74} I$ | | $P_S \approx 0$ | |

TABLE 8

| Example | Number of optically active aromatic compound (Example) | Spontaneous polarization (nc/cm²) |
|---|---|---|
| 93 | 57 | 12 |
| 94 | 65 | 30 |
| 95 | 69 | 23 |
| 96 | 71 | 15 |
| 97 | 81 | 20 |

EXAMPLE 98

Into a four-necked flask equipped with a thermometer and a stirrer were charged 1.11 g (5 mmols) of (−)-4-(4-propoxypentyl)phenol, 1.67 g (6 mmols) of 4-decyloxybenzoic acid and 30 ml of anhydrous dichloromethane. Thereto were added 1.22 g (6 mmols) of N,N'-dicyclohexylcarbodiimide and 0.1 g 4-pyrrolidinopyridine and the mixture was stirred at room temperature for a whole day and night.

After completion of reaction, the resulting precipitate was collected by filtration and diluted with 200 ml of toluene. The organic layer was washed with water, 5% aqueous acetic acid, water, 5% aqueous sodium hydrogencarbonate, and water in succession, then dried over anhydrous magnesium sulfate and thereafter concentrated under reduced pressure. The residue was purified by silica gel column chromatography (eluent: toluene-ethyl acetate) to obtain 2.03 g (yield 84%) of (−)-4-decyloxybenzoic acid 4-(4-propoxypentyl)phenyl ester.

EXAMPLE 99

Into a four-necked flask equipped with a thermometer and a stirrer were charged 1.25 g (5 mmols) of (+)-4-(4-butyryloxypentyl)phenol and 20 ml of pyridine. Thereto was added 1.78 g (6 mmols) of 4-decyloxybenzoic acid chloride at 20°–25° C., followed by stirring for 1 hour at that temperature and then for 4 hours at 40° C.

After completion of reaction, the reaction mixture was poured into 4N hydrochloric acid and extracted with 200 ml of toluene. The organic layer was washed with water, 5% aqueous sodium hydrogencarbonate and water in succession, then dried over anhydrous magnesium sulfate and thereafter concentrated under reduced pressure. The residue was purified by silica gel column chromatography (eluent: toluene-ethyl acetate) to obtain 2.45 g (yield 96%) of (+)-4-decyloxybenzoic acid 4-(4-butyryloxypentyl)phenyl ester.

EXAMPLES 100–129

Reaction and after-treatment were carried out in the same manner as in Example 98 except that starting carboxylic acids and starting phenols as shown in Table 9 were used. The results obtained are shown in Table 9. (For reference, yields and properties of the compounds obtained in Examples 98–99 are also shown in Table 9.)

TABLE 9

$$Z = \text{(CH)}_p - \overset{CH_3}{\underset{*}{CH}} -$$

| | Starting material compound (IV) or (II) | | | | Optically active starting material compound (V) or (III) | | | | | Optically active aromatic compound (I) | | | | | | | | Yield (%) | $[\alpha]_D^{20}$, (c = 1, CHCl_3) |
|---|---|---|---|---|---|---|---|---|---|---|---|---|---|---|---|---|---|---|---|
| Example | R_1 | Y | l | m | R_2 | k | p | s | R_1 | Y | X | R_2 | l | k | m | s | p | | |
| 98 | n-C_10H_21 | —O— | 1 | 1 | n-C_3H_7 | 1 | 3 | 0 | n-C_10H_21 | —O— | —COO— | n-C_3H_7 | 1 | 1 | 1 | 0 | 3 | 84 | −2.3° |
| 99 | " | " | " | " | " | " | " | 1 | " | " | " | " | " | " | " | 1 | " | 96 | +0.6° |
| 100 | " | " | " | " | n-C_5H_11 | " | " | 0 | " | " | " | n-C_5H_11 | " | " | " | 0 | " | 85 | −2.2° |
| 101 | n-C_8H_17 | —COO— | " | " | n-C_3H_7 | " | " | " | n-C_8H_17 | —COO— | " | n-C_3H_7 | " | " | " | " | " | 86 | −2.5° |
| 102 | " | —O— | " | " | —(CH_2)_3OC_2H_5 | " | " | " | " | —O— | " | —(CH_2)_3OC_2H_5 | " | " | " | " | " | 84 | −2.3° |
| 103 | " | " | " | " | $\underset{*}{\overset{CH_3}{CH}}$—CH_2CHC_2H_5 (S) | 1 | " | " | " | " | " | $\underset{*}{\overset{CH_3}{CH}}$—CH_2CHC_2H_5 (S) | " | " | " | " | " | 83 | −3.0° |
| 104 | " | " | " | " | $\underset{*}{\overset{F}{CH}}$—CH_2CHC_5H_11 (S) | 1 | " | " | " | " | " | $\underset{*}{\overset{F}{CH}}$—CH_2CHC_5H_11 (S) | " | " | " | " | " | 82.5 | −3.2° |
| 105 | n-C_10H_21 | —O— | 1 | 1 | n-C_5H_11 | 1 | 3 | 0 | n-C_10H_21 | —O— | —OCO— | n-C_5H_11 | 1 | 1 | 0 | 0 | 3 | 89 | −2.2° |
| 106 | n-C_9H_19 | —()— | 2 | 0 | " | " | " | " | n-C_9H_19 | —()— | —COO— | " | 2 | " | " | " | " | 88 | −1.9° |
| 107 | n-C_10H_21 | —O— | 1 | 1 | " | " | " | " | n-C_10H_21 | —O— | —OCO— | " | 1 | " | 1 | " | " | 90 | −1.9° |
| 108 | " | " | " | " | " | " | " | " | " | " | —COO— | " | " | " | " | " | " | " | −2.0° |
| 109 | " | " | " | " | n-C_8H_17 | " | " | " | " | " | " | n-C_8H_17 | " | " | " | " | " | 89 | −1.8° |
| 110 | n-C_16H_33 | —OCO— | " | " | n-C_5H_11 | 2 | 3 | " | n-C_8H_17 | —OCO— | —OCO— | n-C_5H_11 | 2 | " | " | " | " | 87 | −1.6° |
| 111 | n-C_8H_17 | —O— | " | " | n-C_16H_33 | 2 | " | " | n-C_16H_33 | —O— | —COO— | n-C_16H_33 | 2 | " | " | " | " | 85 | −1.8° |
| 112 | " | " | " | " | n-C_3H_7 | 1 | " | 1 | n-C_8H_17 | " | —OCO— | n-C_3H_7 | 1 | 1 | 0 | 1 | " | 85 | −2.0° |
| 113 | n-C_10H_21 | " | " | " | " | 1 | 4 | 0 | n-C_3H_7 | " | —COO— | " | 1 | " | " | 0 | 4 | 88 | −2.1° |
| 114 | " | " | " | " | n-C_5H_11 | " | 4 | " | n-C_10H_21 | " | —OCO— | n-C_5H_11 | 1 | " | 1 | " | 4 | 84 | −2.5° |
| 115 | " | " | " | " | n-C_4H_9 | " | " | " | " | " | " | n-C_4H_9 | " | " | 0 | " | " | 81 | −3.0° |
| 116 | n-C_16H_33 | —OCO— | " | " | n-C_5H_11 | " | " | 1 | " | " | —COO— | n-C_5H_11 | " | " | " | 1 | " | 89 | +1.5° |
| 117 | n-C_10H_21 | — | 2 | 0 | n-C_3H_7 | " | " | 0 | n-C_16H_33 | —OCO— | —OCO— | n-C_3H_7 | 2 | " | 1 | 0 | " | 87 | −1.9° |
| 118 | " | —O— | 1 | 1 | " | " | " | " | n-C_10H_21 | —O— | —COO— | " | 1 | 2 | " | " | " | 86 | −2.1° |
| 119 | " | " | " | " | " | 2 | " | " | " | " | —OCO— | " | " | 1 | " | " | " | 89 | −2.8° |
| 120 | " | —O— | 1 | 1 | $\underset{*}{\overset{CH_3}{CH}}$—CH_2CHOC_3H_7 (S) | 1 | 4 | 0 | " | —O— | —COO— | $\underset{*}{\overset{CH_3}{CH}}$—CH_2CHOC_3H_7 (S) | 1 | 1 | 1 | 0 | 4 | 91 | −5° |
| 121 | " | —O— | 1 | 1 | —(CH_2)_3OC_2H_5 | 1 | 4 | 0 | " | —COO— | " | —(CH_2)_3OC_2H_5 | 1 | 1 | 0 | 0 | 4 | 81 | −4° |
| 122 | " | —COO— | " | " | n-C_4H_9 | 1 | 4 | 1 | " | —COO— | " | n-C_4H_9 | " | " | 1 | 1 | 4 | 85 | +2.3° |
| 123 | C_10H_21 | —O— | " | " | n-C_3H_7 | 1 | 5 | 0 | C_10H_21 | —O— | " | n-C_3H_7 | " | " | " | 0 | 5 | 85 | −1.1° |
| 124 | C_12H_25 | " | " | " | " | " | 5 | " | C_12H_25 | " | " | " | " | " | " | " | " | 88 | −1.5° |
| 125 | C_12H_25 | " | " | " | —(CH_2)_3OC_2H_5 | " | " | " | C_12H_25 | " | " | —(CH_2)_3OC_2H_5 | " | " | " | " | " | 78 | −2° |
| 126 | C_16H_33 | —OCO— | " | " | n-C_9H_19 | " | " | 1 | C_16H_33 | —OCO— | " | n-C_9H_19 | " | " | " | 1 | " | 81 | +0.9° |

TABLE 9-continued $$Z = +CH)_p - \overset{CH_3}{\underset{*}{CH}} -$$

| | Starting material compound (IV) or (II) | | | | | Optically active starting material compound (V) or (III) | | | | | Optically active aromatic compound (I) | | | | | | | | Yield | $[\alpha]_D^{20}$, (c = 1, |
|---|---|---|---|---|---|---|---|---|---|---|---|---|---|---|---|---|---|---|---|---|
| Example | R$_1$ | Y | l | m | | R$_2$ | k | p | s | R$_1$ | Y | X | R$_2$ | l | k | m | s | p | (%) | CHCl$_3$) |
| 127 | C$_{12}$H$_{25}$ | —O— | 2 | 1 | | n-C$_3$H$_7$ | 1 | 5 | 0 | C$_{12}$H$_{25}$ | —O— | —COO— | n-C$_3$H$_7$ | 2 | 1 | 1 | 0 | 5 | 85 | −2° |
| 128 | C$_{12}$H$_{25}$ | —O— | 2 | 1 | | n-C$_3$H$_7$ | 1 | 5 | 0 | C$_{12}$H$_{25}$ | —O— | —OCO— | n-C$_3$H$_7$ | 2 | 1 | 1 | 0 | 5 | 90 | −2.5° |
| 129 | C$_8$H$_{17}$ | —O— | 1 | 1 | | n-C$_3$H$_7$ | 2 | 5 | 0 | C$_8$H$_{17}$ | —O— | —COO— | n-C$_3$H$_7$ | 1 | 2 | 1 | 0 | 5 | 86 | −3° |

**m = 0

Phase transition temperature and value of spontaneous polarization of the compounds obtained in Table 9 are shown in Table 10 (The values of spontaneous polarization are those measured by using liquid crystal element prepared by the method of preparation of liquid crystal elements hereinafter stated.).

TABLE 10

| Compound No. | Phase transition temperature (°C.) | Spontaneous Polarization (nc/cm$^2$) (T − Tc = −10° C.) |
|---|---|---|
| 100 | K $\xrightarrow{13}$ I, K $\xrightarrow{-14}$ S$_c$*, S$_c$* $\xrightarrow{-4}$ S$_A$ | 12 |
| 107 | K $\xrightarrow{28}$ S$_1$ $\xrightarrow{54}$ S$_c$* $\xrightarrow{112}$ Ch $\xrightarrow{131}$ I | 5 |
| 112 | K $\xrightarrow{51}$ S$_1$ $\xrightarrow{62}$ S$_c$* $\xrightarrow{95}$ Ch $\xrightarrow{129}$ I | 15 |
| 113 | K — S$_1$ $\xrightarrow{62}$ S$_c$* $\xrightarrow{67}$ Ch $\xrightarrow{102}$ I | 26 |

Thus, the compound which shows it self S*$_c$ phase, shows value of practical spontaneous polarization.

EXAMPLES 130-132

The liquid crystal compositions shown in Table 11 were prepared using the liquid crystal compounds. The preparation procedure was that a given compound weighed in a given amount was mixed in a sample bottle, while being heated and molten.

[Process for the preparation of liquid crystal element]

On a glass substrate provided with an indium oxid transparent electrode, a polyimide polymeric membrane is further provided. This is rubbed using a gauze in a certain direction and then a liquid crystal cell is assembled by using glass fibers (a diameter of 5 μm) as a spacer, so as to allow two substrates to be parallel in the rubbing direction. The above liquid crystal composition(s) or compound(s) is sealed in vacuo into the liquid crystal cell to obtain a liquid crystal element.

To the thus-obtained liquid crystal element combined with a polarizer, 20 V of electric voltage were applied, and then change in transmitted light strength was observed. At that time, spontaneous polarization values (determined by Sawyer-Tower method) is shown in Table 11.

As clear from the results, when the liquid crystal materials of the present invention is used, ferroelectric liquid crystals can be made when such liquid crystal materials are formed into liquid crystal compositions, even if such materials per se do not exhibit any liquid crystal phase.

TABLE 11

| Example | Composition component (wt %) or Compd. No. | P$_S$ (nc/cm$^2$) |
|---|---|---|
| 130 | 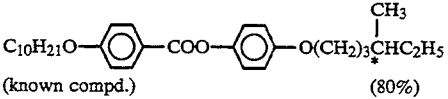 (known compd.) (80%)<br>(Compound of Example 99) (20%) | 9 |
| 131 | 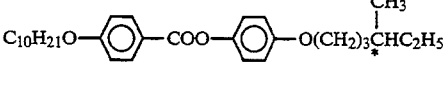 (80%)<br>(Compound of Example 101 exhibiting K-I phase) (20%) | 4 |
| 132 | 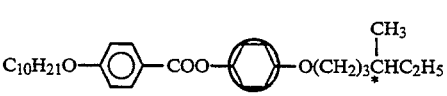 (80%)<br>(Compound of Example 122 exhibiting K-I phase) (20%) | 8 |
| Cf | 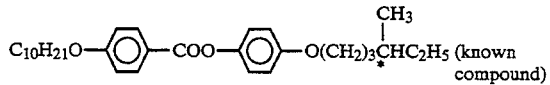 (known compound)<br>K $\xrightarrow{35}$ S$_c$* $\xrightarrow{70}$ S$_A$ $\xrightarrow{74}$ I | P$_S$ ≈ 0 (nc/cm$^2$) |

EXAMPLES 133-136

The liquid crystal materials shown in Table 12 are sealed in the liquid crystal elements prepared by the method of preparation of liquid crystal elements in Example 130 and are measured respectively in the spontaneous polarization. The results are given in Table 12.

TABLE 12

| Example | Compound No. | Spontaneous polarization (nc/cm$^2$) |
|---|---|---|
| 133 | 98 | 12 |
| 134 | 114 | 9 |
| 135 | 121 | 8 |
| 136 | 123 | 13 |

We claim:

1. An optically active aromatic compound represented by the formula,

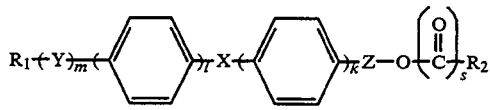

wherein X represents —COO— or —OCO—; Y represents —COO—, —OCO— or —O—; $R_2$ represents an alkyl or alkoxyalkyl group having 1 to 20 carbon atoms unsubstituted or substituted by a halogen atom; $R_1$ represents an alkyl group having 3 to 20 carbon atoms; Z represents

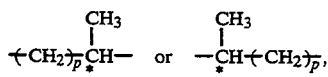

wherein p represents a number of 1 to 5 and * indicates an asymmetric carbon atom; l and k each represents a number of 1 or 2 provided that $l+k \leq 3$; m and s each represents a number of 0 or 1.

2. The compound according to claim 1, wherein Z is

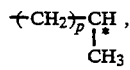

wherein p is as defined in claim 1.

3. The compound according to claim 2, wherein X is —COO—.

4. The compound according to claim 1, wherein s represents 0.

5. The compound according to claim 1, wherein $R_1$ is an alkyl group having 8 to 16 carbon atoms.

6. The compound according to claim 1, wherein $R_2$ is an alkoxyalkyl group having 2 to 20 carbon atoms unsubstituted or substituted with a halogen atom.

7. A liquid crystal comprising at least one member selected from optically active aromatic compounds represented by the formula,

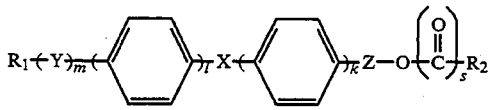

wherein X represents —COO— or —OCO—; Y represents —COO—, —OCO— or —O—; $R_2$ represents an alkyl or alkoxyalkyl group having 1 to 20 carbon atoms unsubstituted or substituted by a halogen atom; $R_1$ represents an alkyl group having 3 to 20 carbon atoms; Z represents

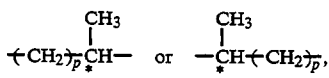

wherein p represents a number of 1 to 5 and * indicates an asymmetric carbon atom; l and k each represents a number of 1 or 2 provided that $l+k \leq 3$; m and s each represents a number of 0 or 1.

8. A light switching element comprising a liquid crystal comprising at least one member selected from optically active aromatic compounds represented by the formula,

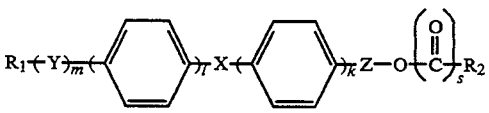

wherein X represents —COO— or —OCO—; Y represents —COO—, —OCO— or —O—; $R_2$ represents an alkyl or alkoxyalkyl group having 1 to 20 carbon atoms unsubstituted or substituted by a halogen atom; $R_1$ represents an alkyl group having 3 to 20 carbon atoms; Z represents

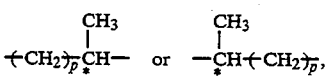

wherein p represents a number of 1 to 5 and * indicates an asymmetric carbon atom; l and k each represents a number of 1 or 2 provided that $l+k \leq 3$; m and s each represents a number of 0 or 1.

* * * * *